US008640209B2

(12) United States Patent
Ohkado

(10) Patent No.: US 8,640,209 B2
(45) Date of Patent: Jan. 28, 2014

(54) AUTHENTICATION INFORMATION CHANGE FACILITY

(75) Inventor: Akira Ohkado, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 595 days.

(21) Appl. No.: 12/718,968

(22) Filed: Mar. 6, 2010

(65) Prior Publication Data
US 2011/0219437 A1    Sep. 8, 2011

(51) Int. Cl.
G06F 7/04 (2006.01)
G06F 21/31 (2013.01)

(52) U.S. Cl.
CPC ...................................... G06F 21/31 (2013.01)
USPC ............................................................ 726/6

(58) Field of Classification Search
USPC ...................................................... 726/6, 18
See application file for complete search history.

(56) References Cited

U.S. PATENT DOCUMENTS

| 5,611,048 | A | * | 3/1997 | Jacobs et al. | 726/5 |
| 6,795,967 | B1 | * | 9/2004 | Evans et al. | 719/310 |
| 2007/0192763 | A1 | * | 8/2007 | Helvick | 717/168 |
| 2008/0148268 | A1 | | 6/2008 | Hirouchi | |
| 2008/0215713 | A1 | | 9/2008 | Cannon et al. | |
| 2009/0216782 | A1 | * | 8/2009 | Szyperski et al. | 707/100 |

FOREIGN PATENT DOCUMENTS

| JP | 2003330885 A | 11/2003 |
| JP | 2004021592 A | 1/2004 |
| JP | 2008152482 A | 7/2008 |
| JP | 2008243195 A | 10/2008 |

* cited by examiner

Primary Examiner — Peter Shaw
(74) Attorney, Agent, or Firm — Nelson and Nelson; Daniel P. Nelson; Alexis V. Nelson

(57) ABSTRACT

A system, method, and computer program product are provided to facilitate changing authentication information in an environment having two or more configuration items. Establishing a connection between the configuration items may require matching authentication information corresponding to the first configuration item with authentication information transmitted from the second configuration item. The system may include a repository storing at least one predetermined attribute corresponding to a configuration item, and a relation between the configuration item and another configuration item. The attribute and/or the relation may be updated by discovery that detects information regarding configuration items. In response to a request to change authentication information corresponding to the first configuration item, and based on the relation, an identification unit may identify a second configuration item influenced by the change. An instruction unit may initiate a change of authentication information transmitted from the second configuration item.

11 Claims, 27 Drawing Sheets

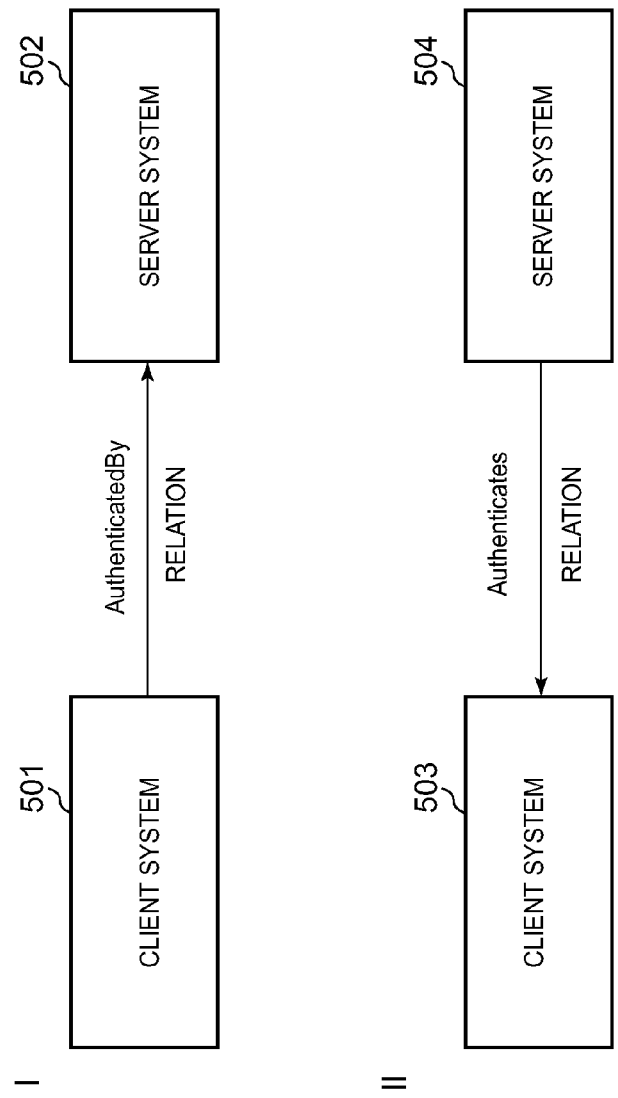

| DATA MODEL | | 421 |
|---|---|---|
| MODEL NAME | A | |
| MODEL ATTRIBUTE | ATTRIBUTE S<br>ATTRIBUTE T<br>ATTRIBUTE U<br>PasswordChange<br>Information | |
| RELATION | usedBy<br>connectAt<br>runAt<br>AuthenticatedBy | |

| CI INSTANCE | | 423 |
|---|---|---|
| INSTANCE NAME | CONFIGURATION ITEM A | |
| MODEL NAME | A | |
| ATTRIBUTE VALUE | S=XXXX<br>T=XXXX<br>U=XXXX<br>PasswordChange<br>Information:knowledge<br>FILE NAME | |
| RELATION | usedBy : M<br>connectAt: E<br>runAt: H<br>AuthenticatedBy: B | |
| STATUS | ACTIVE | |
| CREATION DATE | XXXX/XX/XX/XXXX:XX:XX | |

| RELATION MODEL | | 424 |
|---|---|---|
| RELATION NAME | AuthenticatedBy | |
| MODEL AS TARGET | A.C.D | |
| DESCRIPTION | xxxxx | |

| DISCOVERY | | 422 |
|---|---|---|
| NAME | A-Discovery | |
| COLLECTION TARGET (SCOPE) | Local Domain | |
| COLLECTED ATTRIBUTE | xxxx_xxx_xxx | |
| COLLECTED RELATION | xxxx_xxx_xxx | |
| STATUS | ACTIVE | |

431 DATA MODEL

| MODEL NAME | B | |
|---|---|---|
| MODEL ATTRIBUTE | ATTRIBUTE S<br>ATTRIBUTE T<br>ATTRIBUTE U<br>PasswordChange<br>Information | |
| RELATION | usedBy<br>connectAt<br>runAt<br>Authenticates | |

432 DISCOVERY

| NAME | B-Discovery |
|---|---|
| COLLECTION TARGET (SCOPE) | Local Domain |
| COLLECTED ATTRIBUTE | xxxx_xxx_xxx |
| COLLECTED RELATION | xxxx_xxx_xxx |
| STATUS | ACTIVE |

433 CI INSTANCE

| INSTANCE NAME | CONFIGURATION ITEM B |
|---|---|
| MODEL NAME | B |
| ATTRIBUTE VALUE | S=XXXX<br>T=XXXX<br>U=XXXX<br>PasswordChange<br>Information:knowledge<br>FILE NAME |
| RELATION | usedBy : A<br>connectAt: A<br>runAt: E<br>Authenticates: A |
| STATUS | ACTIVE |
| CREATION DATE | XXXX/XX/XXXX:XX:XX |

434

| RELATION MODEL | Authenticates |
|---|---|
| RELATION NAME | B |
| MODEL AS TARGET | |
| DESCRIPTION | xxxxx |

| RELATION MODEL | |
|---|---|
| RELATION MODEL NAME FORWARD DIRECTION | Authenticates |
| RELATION MODEL NAME BACKWARD DIRECTION | AuthenticatedBy |
| MODEL AS ORIGIN | MODEL B |
| NUMBER ON ORIGIN SIDE | MANY |
| MODEL AS DESTINATION | MODEL A |
| NUMBER ON DESTINATION SIDE | MANY |
| DESCRIPTION | xxxxxx |

441

| RELATION INSTANCE | |
|---|---|
| RELATION MODEL NAME | Authenticates |
| INSTANCE OF ORIGIN | CONFIGURATION ITEM B |
| INSTANCE OF DESTINATION | CONFIGURATION ITEM A |
| STATUS | ACTIVE |
| CREATION DATE | XXXX/XX/XXXX:XX:XX |

SIGNATURE — 621

| APPLICATION SOFTWARE NAME | SIGNATURE |
|---|---|
| PRODUCT A VENDER: IBM | FILE xxxx UNDER DIRECTORY yyyy UNDER APPLICATION SERVER zzzz |
| PRODUCT B VENDER: YY | VALUE vvv OF TYPE DWORD UNDER REGISTRY www¥yy KEY |

622 — PRODUCT A row
623 — PRODUCT B row

KNOWLEDGE — 624

| APPLICATION SOFTWARE NAME | AUTHENTICATION COUNTER | AUTHENTICATION METHOD | AUTHENTICATION TARGET |
|---|---|---|---|
| PRODUCT A VENDER: IBM | DB SERVER | PASSWORD | DB NAME KEY aaa IN PROPERTY FILE bbb |
| PRODUCT B VENDER: YY | DB SERVER | PASSWORD | DB NAME IN REGISTRY |

625 — PRODUCT A row
626 — PRODUCT B row

FIG. 6C

| DATA MODEL | | 711 |
|---|---|---|
| MODEL NAME | A1 | |
| MODEL ATTRIBUTE | ATTRIBUTE S<br>ATTRIBUTE T<br>ATTRIBUTE U<br>PasswordChange<br>Information<br>StartUp<br>ShutDown | |
| RELATION | usedBy<br>connectAt<br>runAt<br>AuthenticatedBy | |

| CI INSTANCE | | 713 |
|---|---|---|
| INSTANCE NAME | CONFIGURATION ITEM A1 | |
| MODEL NAME | A1 | |
| ATTRIBUTE VALUE | S=XXXX<br>T=XXXX<br>U=XXXX<br>PasswordChange<br>Information:knowledge<br>FILE NAME<br>StartUp: 20 min<br>ShutDown: 10 min | |
| RELATION | usedBy : M<br>connectAt: A,S<br>runAt: A<br>AuthenticatedBy:S | |
| STATUS | ACTIVE | |
| CREATION DATE | XXXX/XX/XX/XXX:XX:XX | |

| RELATION MODEL | | 714 |
|---|---|---|
| RELATION NAME | AuthenticatedBy | |
| MODEL AS TARGET | A1 | |
| DESCRIPTION | xxxxx | |

FIG. 7B

KNOWLEDGE

721

| APPLICATION INFORMATION | AUTHENTICATION METHOD | APPLICATION STOP NEEDED? (Yes/No) |
|---|---|---|
| PRODUCT: A<br>VENDER: IBM | PASSWORD | Yes |
| PRODUCT: B<br>VENDER: YY CORPORATION | PASSWORD | Yes |
| PRODUCT: C<br>VENDER:<br>SELF-DEVELOPED PRODUCT | PASSWORD<br>DIGITAL CERTIFICATE | Yes |

722

| APPLICATION INFORMATION | APPLICATION STOP PROCESSING METHOD | APPLICATION START PROCESSING METHOD | CHANGE NECESSARY TIME | CHANGE METHOD OF AUTHENTICATION INFORMATION |
|---|---|---|---|---|
| PRODUCT: A<br>VENDER: IBM | STOP APPLICATION IBM: A<br>(Stop Application IBM: A) | START APPLICATION IBM: A<br>(Start Application IBM: A) | 40MINUTES | PASSWORD CHANGE APPLICATION IBM: A |
| PRODUCT: B<br>VENDER: YY CORPORATION | STOP APPLICATION YY: B<br>(Stop Application Y: B) | START APPLICATION YY: B<br>(Start Application Y: B) | 50MINUTES | PASSWORD CHANGE APPLICATION YY: B |
| PRODUCT: C<br>VENDER:<br>SELF-DEVELOPED PRODUCT | STOP APPLICATION INHOUSE: C<br>(Stop Application In-House: C) | START APPLICATION INHOUSE: C<br>(Start Application In-House: C) | 50MINUTES | PASSWORD CHANGE APPLICATION SELF-DEVELOPED PRODUCT: C |

FIG. 7C

AUTHENTICATION INFORMATION CHANGE FACILITY

RELATED APPLICATIONS

This application is related to Japan Patent Application No. 2009-31612, filed on Feb. 13, 2009 and entitled COMPUTER SYSTEM TO CHANGE AUTHENTICATION INFORMATION AND METHOD THEREOF, AND COMPUTER PROGRAM.

BACKGROUND

In recent years, corporate acquisitions, mergers, division reorganizations and corporate alliances have become relatively commonplace occurrences that result in an increased number of user identities (hereinafter, "IDs") to be managed by a system. Temporary employment of contract workers, temporary transfer, and permanent transfer of employees are other scenarios that may necessitate a change of authentication ID information or passwords.

ID management is a technique to distribute user IDs and passwords to a plurality of systems.

SUMMARY

Embodiments of the invention have been developed to facilitate changing authentication information in an environment where establishing a connection between configuration items requires matching corresponding authentication information.

In certain embodiments, a system is provided to facilitate changing authentication information in an environment having two or more configuration items. Establishing a connection between the configuration items may require matching authentication information corresponding to the first configuration item with authentication information transmitted from the second configuration item. Accordingly, the system may include a repository storing at least one predetermined attribute corresponding to a configuration item, and a relation between the configuration item and another configuration item. The attribute and/or the relation may be updated by discovery that detects information regarding configuration items.

The system may further include an identification unit. In response to a request to change authentication information corresponding to the first configuration item, and based on the relation, the identification unit may identify a second configuration item influenced by the change. The system may also include an instruction unit for initiating a change of authentication information transmitted from the second configuration item.

A corresponding method and computer program product are also disclosed and claimed herein.

BRIEF DESCRIPTION OF THE DRAWINGS

In order that the advantages of the disclosure will be readily understood, a more particular description of embodiments of the invention briefly described above will be rendered by reference to specific embodiments illustrated in the appended drawings. Understanding that these drawings depict only typical embodiments of the invention and are not therefore to be considered limiting of its scope, embodiments of the invention will be described and explained with additional specificity and detail through use of the accompanying drawings, in which:

FIG. 5A illustrates relations "AuthenticatedBy" and "Authenticates" on a CMDB between a client system and a server system in accordance with one embodiment of the invention;

FIG. 5B illustrates an exemplary CI instance, data model and relation model of a client system in accordance with certain embodiments, including the relation "AuthenticatedBy" as illustrated in FIG. 5A;

FIG. 5C illustrates an exemplary CI instance, data model and relation model of a server system in accordance with certain embodiments, including the relation "Authenticates" as illustrated in FIG. 5A;

FIG. 5D illustrates the exemplary relation model "Authenticates" of FIG. 5C, and a relation instance thereof;

FIG. 6C is a conceptual diagram of one embodiment of the signature and knowledge used in the discovery method of FIG. 6B;

FIG. 7B illustrates an exemplary CI instance, data model and relation model for the application software of FIG. 7A;

FIG. 7C illustrates one embodiment of knowledge that may be used to change authentication information for the system of FIG. 7A;

DETAILED DESCRIPTION OF THE INVENTION

Figure 1A:
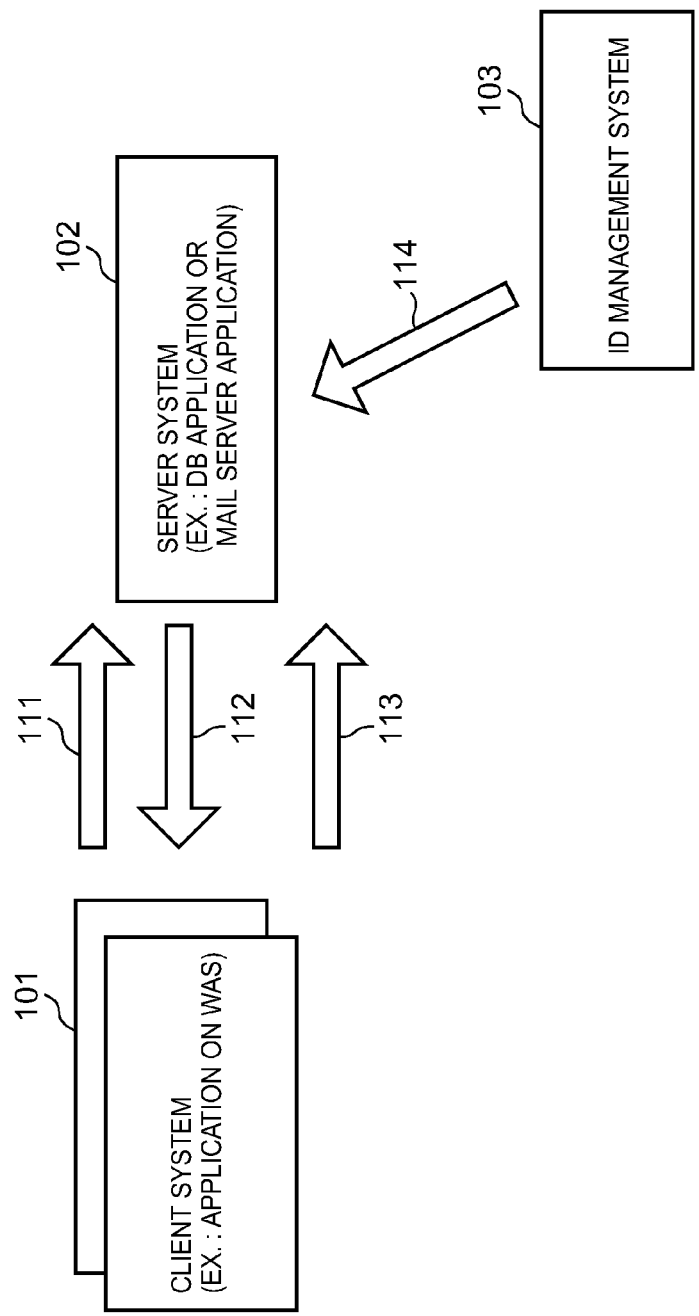
FIG. 1A illustrates an exemplary ID management system.

It will be readily understood that the components of the embodiments of the invention, as generally described and illustrated in the Figures herein, could be arranged and designed in a wide variety of different configurations. Thus, the following more detailed description of the embodiments of the invention, as represented in the Figures, is not intended to limit the scope of the claims, but is merely representative of certain examples of presently contemplated embodiments in accordance with the invention. The presently described embodiments will be best understood by reference to the drawings, wherein like parts are designated by like numerals throughout.

As will be appreciated by one skilled in the art, embodiments of the invention may be embodied as an apparatus, system, method, or computer program product. Furthermore, the present invention may take the form of an entirely hardware embodiment, an entirely software embodiment (including firmware, resident software, micro-code, etc.) or an embodiment combining software and hardware elements. Hardware and/or software elements provided to perform various tasks may be generally referred to herein as "modules." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CDROM"), an optical storage device, transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Authentication information on an account for a server system (such as database ("DB") server system or a mail server system) may be used for connection from a client system. When the authentication information of the server system is changed, there is a possibility that the client system may fail to connect with the server system, causing a connection error. Therefore, the authentication information that the client system connecting with the server system uses may also need to be changed. As the number of client systems increases, however, the scope of the job becomes huge. Therefore, ID management may, in response to a change in authentication information, automatically identify hardware or software to which the changed password should be distributed.

General Information

The Information Technology Infrastructure Library® ("ITIL") is a collection of best practices to implement IT service management. A focus of ITIL includes service support and service delivery, which may include configuration management. Configuration management refers to a process of recognizing configuration items ("CI") as managing targets of IT service management, maintaining and updating information on the configuration items, and confirming and auditing the same. The configuration items may be target resources of the configuration management. The configuration items may include not only system resources such as hardware and software, but may also include resources needed to provide IT services, such as documents or manuals concerning IT service operation, operation procedure manuals, configuration diagrams, services such as maintenance operations of hardware and software, processes, and human resources, for example.

One framework of ITIL recommends unified management using a database called Configuration Management Database ("CMDB") to manage configuration items. CMDB is a database to record at least one predetermined attribute of a configuration item and a relationship with other configuration items. CMDB may facilitate automatic discovery or automatic detection information regarding the configuration item, and may also enable automatic update or tracking of the same. CMDB may precisely reflect information about configuration items on the CMDB.

Tivoli® Change and Configuration Management Database ("Tivoli CCMDB") is one example of software to support the configuration of CMDB and control operation process based on CMDB. Tivoli® CCMDB may install operation management software so as to execute discovery and tracking. Tivoli® CCMDB may recognize hundreds of types of configuration items on a distributed network environment including servers, clients, operating systems ("OS"), middleware (Web/AP/DBMS/LDAP and the like), package soft, management tools, network equipment, storage equipment and the like. Tivoli® CCMDB may further automatically discover and update information on the respective configuration items, e.g., information on the configuration of a computer, information on application software operating on each computer, configuration information on a network connection storage ("NAS") connected with each computer, and configuration information on a storage area network ("SAN") directly connected with the network.

Although a method to collect information on each configuration item varies depending on managing targets, a computer system that manages CMDB may use Secure Shell ("SSH") or the like to regularly access a remote interface for management to read out a setting file on OS or configuration information. In other cases, a computer system that manages CMDB may execute a setting confirmation command. Therefore, there is little need to introduce an agent program to a configuration item as a management target.

The information discovered and updated as set forth above may be categorized based on a data model such as "Common Data Model" (hereinafter called "CDM"), and divided into sections (such as Computer System, Database, Application, and Process), classes (basic unit of data model, belonging to one or a plurality of sections), attributes (attribute information of data, belonging to one class), interfaces (a group of frequently used attributes, belonging to a plurality of sections), relations (relationship), and data types (class of data). Information on each configuration item and a relation between the configuration item and other configuration items may be passed to a display tool or GUI, such as Tivoli® Application Dependency Discovery Manager ("TADDM") console. Then, each configuration item and a relation between the configuration item and other configuration items may be displayed visually on a display using individual blocks and links between the blocks.

DEFINITIONS

As used herein, the term "first configuration item" may refer to a server used for authentication. Alternatively, the first configuration item may refer to application software that performs authentication in response to an authentication request from another system, or to a system where the application software operates. The first configuration item may request authentication information from a second configuration item to enable the second configuration item connect with the first item, for example. In other embodiments, the first configuration item may include a DB server system, a mail server system, DB application software, or mail application software. In response to a connection request from the second configuration item, the first configuration item may transmit a command to the second configuration item to transmit the authentication information.

The term "second configuration item" may refer to a client that requests and receives authentication from the server. In some embodiments, the second configuration item may refer to application software that requests authentication from another system, or to a system where the application software operates. The second configuration item may transmit the authentication information to the first configuration item in response to a request from the first configuration item.

In certain embodiments, the first configuration item and the second configuration item may each refer to application software in the same system. In this case, one of the application software functions as a client, and the other functions as a server.

The term "authentication information" may refer to an ID, a password, or a digital certificate, a combination thereof, or the like. The authentication information may be sent from the second configuration item to the first configuration item to enable the second configuration item to establish a connection with the first configuration item. If the authentication information stored on the first configuration item for the second configuration item matches the authentication information transmitted from the second configuration item to the first configuration item, the first configuration item may permit the second configuration item to connect therewith.

The following terms may be used to describe embodiments implementing a CMDB.

The term "repository" may refer to a repository used to store at least one pair or set of data. The data may indicate at least one predetermined attribute of a configuration item and a relation with another configuration item. The data may indicate at least one predetermined attribute of a configuration item (such as a hardware configuration item or a software configuration item) and a relation with another configuration item. In one embodiment, the repository may be a CMDB. A configuration item and a relation with the configuration item and another configuration item may be installed as an instance of static data, as an instance of a class of Java®, or the like. In one embodiment, the repository may be a CMDB recording unit that records the CMDB that includes the data.

The term "configuration item" or "CI" refers to data corresponding to a configuration item belonging to the scope of IT service management, and is a basic unit of a management target in IT service management. A CI may be a system resource, including hardware and software, a facility necessary to provide IT services, documents such as a manual concerning IT service operation, an operation procedure manual, and configuration diagrams, a service such as maintenance operation of hardware and software, a process, or a human resource, for example. Various types of CIs may be further managed in the CMDB. Each CI may be represented as an instance of a data model on the CMDB.

The term "configuration management database" or "CMDB" may refer to a database performing unified storage and management of information concerning all components of an information system. The CMDB may record at least one predetermined attribute of each CI and a relationship with another CI. The CMDB may support an organization to understand a relation between components, and may enable the management of the configuration. The CMDB may serve as the core of a configuration management process in the ITIL framework. Although CMDB is conceptually a database, it may be in the physical form of a database system, or a spreadsheet of spreadsheet software. The CMDB may facilitate an administrator being able to understand a relation between CIs.

The term "configuration item instance" or "CI instance" refers to data corresponding to a CI. Each CI instance may be represented as an instance of a data model on the CMDB. An example of the instance may be an instance of static data or an instance of a class of Java®. In certain embodiments, an installed instance of a class of Java® may be stored in the CMDB by a structure called Java Data Objects ("JDO") that stores an instance of a class of Java® perpetually in a hard disk. Therefore, even when the power to a computer system is turned off, a created instance of a class of Java® may not disappear, and when the power is next turned on, the instance may be read out from a storage device such as a hard disk, expanded onto a main memory, and may become an instance of a class of Java® that may be changed or deleted by a program of Java®. In some embodiments, a CI may be installed as an instance in the CMDB.

The term "data model" refers to a schema to define CIs, or an information model to provide a consistent definition of managed CIs and a relation between such CIs. More specifically, a data model may define a predetermined attribute of a CI and a relation with another CI (manufacturing apparatus, process and the like). An example of data model may include a CDM data model for a configuration management database. CDM may be installed based on Unified Modeling Language ("UML"), for example.

The term "attribute" refers to a word used to identify and describe individual CIs for management purposes. Attributes may include, for example, a name of CI (e.g., server, client, or firewall), product number ("ID") (to identify a specific entity of CI individually, including product number and serial number), category (classification of CI, e.g., hardware, software and document), type (description of CI that describes the classification of category in more detail), model number (model number of CI that a supplier names), guarantee period (guarantee period provided by a CI supplier), version number (version number of CI), location (location where CI exists, e.g., installation location of PC, library of software, storage location of a medium, site that provides a service), owner (name of the person in charge of management of CI), responsibility start date (owner start date), supplier (developer or provider of CI), license (license number, number of licenses, or the like), providing date (when CI is provided to the organization), acceptance date (when CI is accepted), operation start date (when operation of CI starts), status of CI (current status, e.g., in operation, during test, and out of order, or future status, e.g., scheduled CI status), and status of CI instance (valid or invalid), and the like.

The term "relation" refers to a relation between CIs. Relation may be defined with a data model in a similar manner to CIs. Examples of relation may include assigns, canConnect, canUse, connectAt, connects, controls, deployedOn, Located, Managed, Owned, provides, runAt, uses, and usedBy in Common Data Model, and other such relations known to those in the art. Certain embodiments of the present invention include the relations "AuthenticatedBy" and "Authenticates," which may be used to indicate a dependence of authentication information between a client system and a server system.

The following describes a conventional ID management system (FIGS. 1A to 1B), basic concept of CMDB (FIGS. 2A to 2C), and configuration management in CMDB (FIGS. 3A to 3B), as well as systems and methods in accordance with embodiments of the present invention (FIGS. 4A to 9C), with reference to the drawings. Note that since systems and methods in accordance with embodiments of the present invention may use CMDB, the basic concept of CMDB and the configuration management of CMDB will be described referring to FIGS. 2A to 3B.

FIG. 1A illustrates an exemplary conventional ID management system. As shown, a client system 101 may connect with a server system 102 via a network, such as an intranet or the Internet. On the client system 101, application software may be installed and operate on a WebSphere Application Server ("WAS"), for example. Accordingly, "client system" may refer not only to a client system, but also to application software operating on the client system.

On the server system 102, DB application software or mail server application software may be installed. "Server system" may refer not only to a server system, but also to application software operating on the server system.

The client system 101 may transmit authentication information, such as an ID and a password, to the server system 102 to connect therewith. The server system 102 may verify the authentication information, such as an ID and a password, transmitted from the client system 101 to permit the client system 101 to connect with the server system 102.

In response to verification of the authentication, the server system 102 may provide data to the client system 101, enable the client system 101 to update data, or enable the client system 101 to refer to data 112. In this manner, the client system 101 may access the server system 102 to acquire data therefrom, to provide data to the server system 102, or to refer to data in the server system 102.

An ID management system 103 may manage an ID and a password used in the server system 102. The ID management system 103 may further distribute 114 an ID and a password to the client system 101.

Figure 1B:
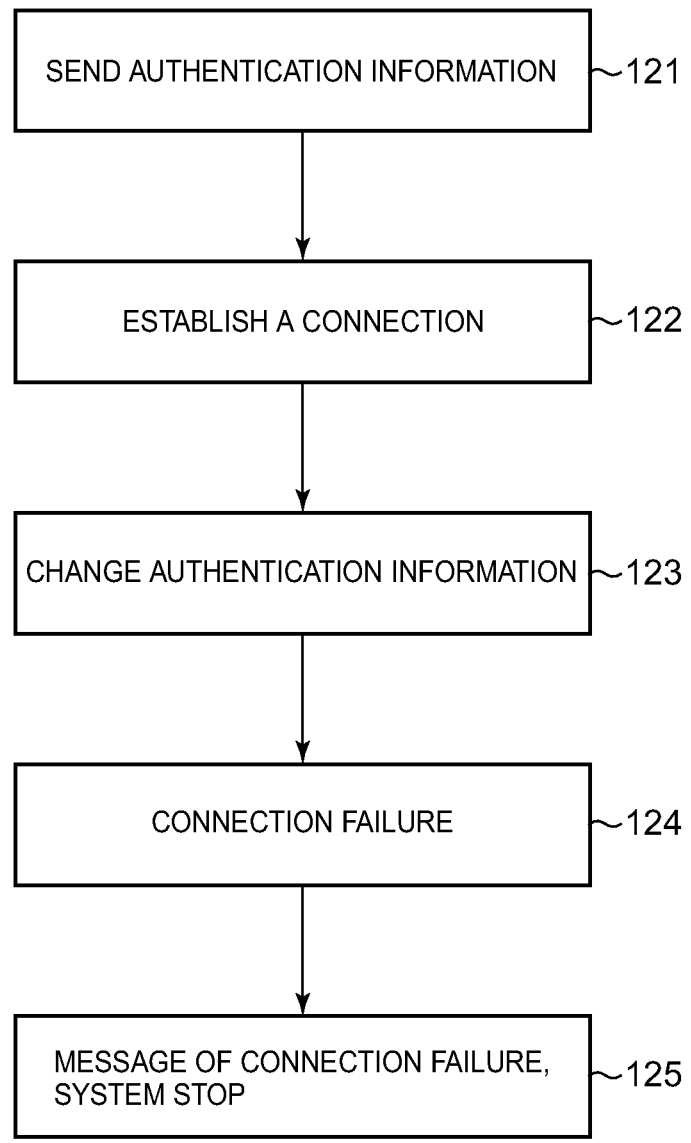
FIG. 1B illustrates an exemplary connection failure due to a change in authentication information in the ID management system of FIG. 1A.

FIG. 1B illustrates an example of a connection failure due to a change in authentication information in the ID management system of FIG. 1A. Specifically, at step 121, the client system 101 may transmit authentication information to the server system 102 to request a connection. The authentication information may be an ID, a password, a digital certificate, a combination thereof, or the like, for the access to the server system 102.

At step 122, the server system 102 may verify the authentication information transmitted from the client system 101. In response to the verification of the authentication information, the server system 102 may establish a connection between the client system 101 and the server system 102. In one embodiment, the application software on the server system 102 may pool a plurality of connections with DB application software on the server system 102, and may keep the same for connection.

At step 123, the ID management system 103 may change the authentication information stored in the server system 102. A change in authentication information may be a change of a password, for example. Since connection may have been established between the client system 101 and the server system 102 at the time when the password is changed, a connection error may not occur immediately on the client system 101. For instance, in the above DB connection example, since the client system 101 pools a plurality of connection routes with the server system 102 and keeps the same, a connection error may not occur when the password is changed. Therefore, the administrator may not always confirm the presence or absence of the influence on the application software on the client system 101 at the time when the authentication information of the server system 102 is changed.

At step 124, when the client system 101 is restarted (or, in the case of application software on the client system 101, the application software is re-executed), the client system 101 may retransmit authentication information to the server system 102 to request a connection. However, since the authentication information on the server system 102 has been changed, a connection between the client system 101 and the server system 102 may not be established, resulting in a connection failure.

At step 125, since the connection is not established, a message of connection failure may be shown on the client system 101, or the client system 101 may stop the operation.

Figure 2A:
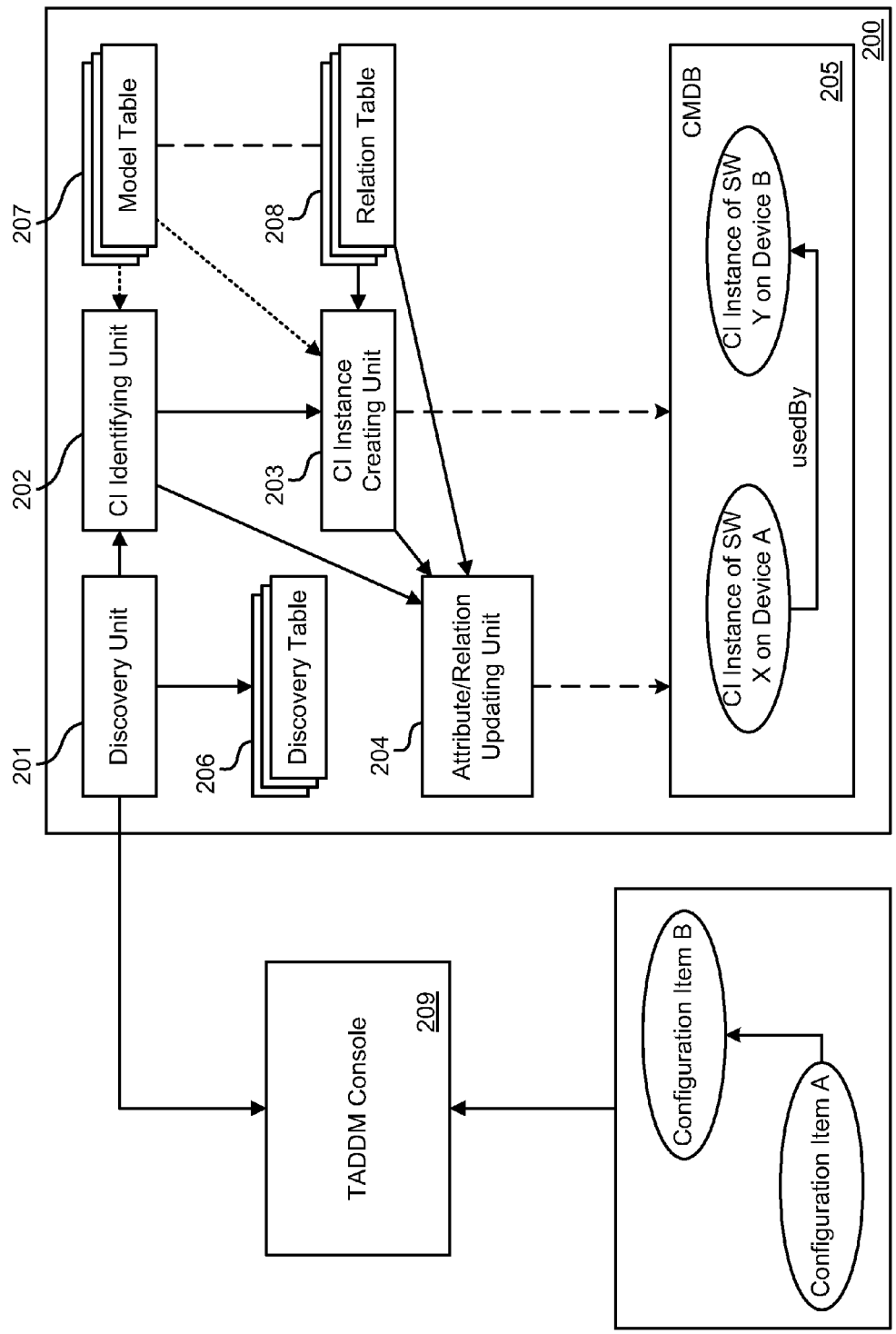
FIG. 2A illustrates one embodiment of a computer system including a CMDB to manage CIs.
Figure 2B:
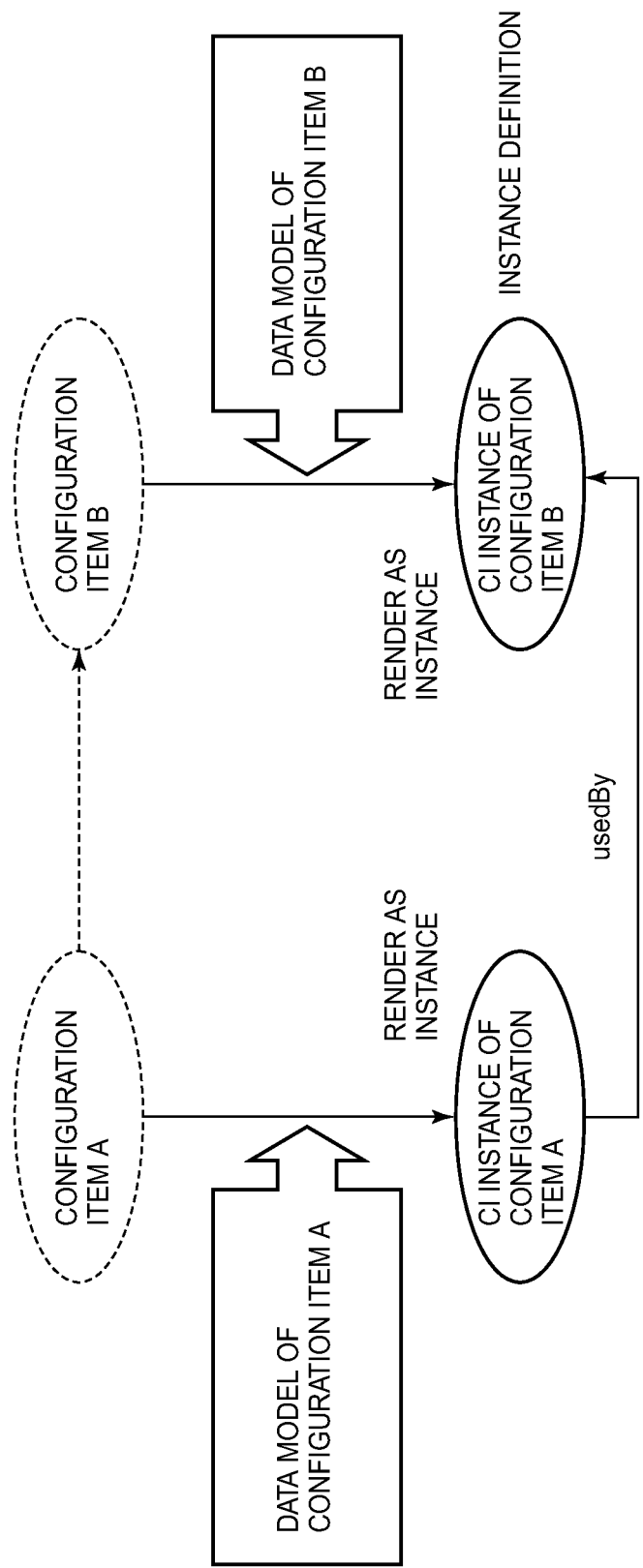
FIG. 2B illustrates creation of CIs, CI instances, and relation (usedBy) instances in accordance with certain embodiments.
Figure 2C:
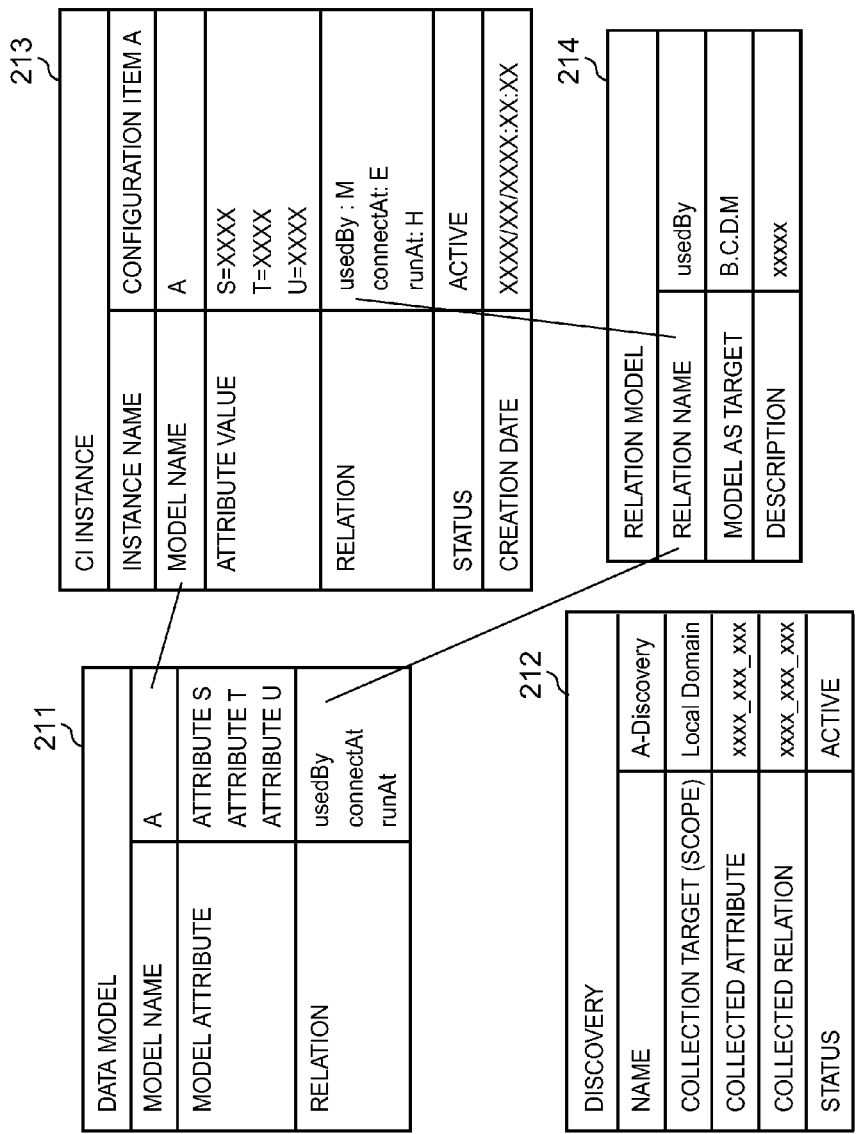
FIG. 2C illustrates a data model, a discovery instance, a CI instance, and a relation model in accordance with certain embodiments of the invention.

FIGS. 2A to 2C illustrate the basic concept of CMDB that systems and methods of embodiments of the present invention may use. FIG. 2A illustrates a computer system 200 including a CMDB to manage CIs. FIG. 2A describes configuration item A and configuration item B as examples of CIs. Each of configuration item A and configuration item B may be any one of a software configuration item and a hardware configuration item. The software configuration item may be, for example, DB2®, WebSphere®, Notes Domino®, Linux, Tomcat, Apache, or the like. The hardware configuration item may be, for example, a client computer, a server computer, or the like.

The computer system 200 may include a discovery unit 201, a CI reconciliation unit 202, a CI instance creation unit 203, an attribute and relation update unit 204, and a CMDB 205. The discovery unit, the CI reconciliation unit, the CI instance creation unit, the attribute and relation update unit and the CMDB may be installed in a single computer, or may be distributed over a plurality of computers for installation. The computer system 200 may further include a discovery table 206, a model table 207, and a relation table 208. These tables may be installed in a single computer, or may be distributed over a plurality of computers for installation.

FIG. 2A further illustrates an exemplary TADDM console screen 209. The screen illustrates CIs and relations between CIs. Note that the CIs and the relations between CIs illustrated on the screen is provided by way of example only, and does not show all CIs and all relations between the CIs as a management target of the computer system 200.

The computer system 200 may manage configuration items as a management targets of its own. In some embodiments, the management target of the computer system 200 may include configuration items that the computer system 200 may discover. In other embodiments, information for configuration items may be manually input, or a combination of automatically and manually discovered configuration items may be set as management targets.

The discovery unit 201 may execute detection of information ("discovery") for CIs as a management target of CMDB. Some of the CIs may be displayed on the TADDM console screen 209. The computer system 200 may include a plurality of discovery units 201. In certain embodiments, the management target may connect with a computer system via a wired or wireless network. The administrator of the computer system may freely set a target of the detection. The scope of the detection may be designated with a domain name, an IP address, a MAC address, an identifier of equipment, a database name, a combination thereof, or the like.

In the case where the CIs as the management target are hardware or software, for example, information on the hardware or the software may be detected. The detected information may be information on a new IC, an update attribute, or a value of a relation of an existing CI, for example. A new CI may be a CI discovered by the discovery unit 201 that is not registered in the CMDB 205. An existing CI may be a CI whose instance has been already registered in the CMDB 205. The discovery unit 201 may detect information on CIs in accordance with a discovery instance (e.g., A-Discovery) stored in the discovery table 206. In some embodiments, the discovery instance to be used may be designated as a discovery method in the data model. The discovery unit 201 may pass the detected information regarding CIs to the CI reconciliation unit 202.

The CI reconciliation unit 202 may receive the information on CIs from the discovery unit 201, and may process a detection result. The CI reconciliation unit 202 may refer to the CMDB 205 to judge whether the information on CIs concerns a new IC, an updated attribute, or a value of a relation of an existing CI. The judgment may be conducted, for example, by comparing an instance name of the CI stored in CMDB with the information on CIs. If the information on CIs concerns a new CI, the CI reconciliation unit 202 may pass the information to the CI instance creation unit 203. On the other hand, if the information on CIs concerns an updated attribute of an existing CI or a value of a relation thereof, the CI reconciliation unit 202 may pass the information to the attribute and relation update unit 204.

A relation between two CI instances may be created, for example, when it is found that there is a relation between configuration item A and configuration B, by identifying the respective instances of configuration items A and B. The CI instance creation unit 203 may create one pair of data indicating a predetermined attribute of the CI and a relation with another CI. This data may be based on information on CIs in accordance with the data model 211 stored in the model table 207, and the relation model 214 stored in the relation table 208. The pair of data may be installed as an instance of static data or an instance of a class of Java®, for example.

An example of the data may include a CI instance. FIG. 2C illustrates an example of the CI instance 213. The pair of data may be stored in the CMDB 205. In some embodiments, the pair of data may have an attribute and a relation in the CI instance 213, or may have an attribute in the CI instance while a relation instance may be separately stored in the CMDB 205. In the latter case, the CI instance may include a link to identify a relation instance associated therewith.

The attribute and relation update unit 204 may implement tracking together with the discovery unit 201. The attribute and relation update unit 204 may reflect an updated attribute or a value of a relation of the CI on a CI instance of the CI stored in the CMDB. That is, the attribute and relation update unit 204 may update the attribute or the value of the relation of the CI instance of the CI. This updating may be conducted by replacing the value with information on the CI detected by the discovery unit 201. As for the replacing, the attribute or the value of the relation of the CI instance as a whole may be replaced with the information on the CI detected by the discovery unit 201, or a different value may be replaced.

The CMDB 205 may store CI instances 213 of CIs. The discovery table 206 may store a discovery instance or policy 212. The discovery instance or policy 212 may be used when the discovery unit 201 detects information on CIs. The discovery instance 212 may be installed as an instance of static data, or as an instance of a class of Java®, for example. The discovery instance 212 may include the scope that the discovery unit 201 searches, i.e., a collection target (scope) of the CI search scope, collected attributes, and collected relations. The collection target may be designated with a subnet IP address, scope of IP addresses, individual IP addresses, a MAC address, an identifier of equipment, a host name, a database name, a combination thereof, or the like.

In another embodiment, the collection target may be a schedule management database (not illustrated) connected with the computer system 200 via a network. The schedule management database may store data concerning process management using equipment, for example. In yet another embodiment, the collection target may be a database (not illustrated) storing a batch processing definition file. In the case where the collection target is a database storing a batch processing definition file, the discovery unit 201 may conduct detection by reading the contents of the batch processing definition file. The batch processing definition file may store the sequence to use equipment, for example.

The model table 207 may store a data model 211. The data model 211 may be used when the CI instance creation unit 203 creates one pair of data indicating a predetermined attribute of the CI and a relation with another CI. The relation table 208 may store a relation model 214. The relation model 214 may be used when the CI instance creation unit 203 creates one pair of data indicating a predetermined attribute of the CI and a relation with another CI.

FIG. 2A illustrates that the discovery unit 201 may detect information concerning an CI as a management target connected with the computer system 200 via a network, and may detect information concerning a configuration item A, configuration item B and a relation between these configuration items. The CI reconciliation unit 202 may refer to the CMDB 205 to determine whether the detected information is for a new or an existing CI. In accordance with the judgment, the CI instance creation unit 203 may create a CI instance of configuration item A, a CI instance of configuration item B, and a relation (usedBy) of these configuration items. The CI instance creation unit 203 may store the respective created instances in the CMDB 205. FIG. 2A illustrates that, in one embodiment, the CI instance of configuration item B has a relation of usedBy with the CI instance of configuration item A.

The discovery unit 201 may create CIs (which may include hardware and/or software CIs) and a relation between such CIs based on the detected information for the CI, and in accordance with a data model 211. The discovery unit 201 may register the same in the CMDB 205. The CMDB 205 may store attributes of the CIs and their relations with other CIs. As a result, the system administrator can use the CMDB 205 to extract a real dependence between CIs.

FIG. 2B illustrates creation of CIs, CI instances, and relation (usedBy) instances. The CI instance of configuration item A may be created by the CI instance creation unit 203 based on the information for the configuration item A detected by the discovery unit 201 using the data model of configuration item A. Similarly, the CI instance of configuration item B may be created by the CI instance creation unit 203 based on the information for the configuration item B detected by the discovery unit 201 using the data model of configuration item B. The respective data models of configuration item A and configuration item B may be stored in the model table 207. An instance of a relation between CIs, i.e., a relation (usedBy) between configuration item A and configuration item B, may be created by the CI instance creation unit 103 based on the information for configuration item A detected by the discovery unit 201 in accordance with the relation model. The relation model may be stored in the relation table 208.

In certain embodiments, where configuration items include configuration items B1, B2 and B3, for example, the respective information on configuration items B1, B2 and B3 may be rendered as an instance using the data model for configuration item B, so that a CI instance of configuration item B1, a CI instance of configuration item B2, and a CI instance of configuration item B3 may be created, respectively. The respective CI instances of configuration items B1, B2, and B3 may also be stored in the CMDB 205.

FIG. 2C illustrates a data model 211 stored in the model table 207, a discovery instance 212 stored in the discovery table 206, a CI instance 213 (of configuration item A) stored in the CMDB 205, and a relation model 214 stored in the relation table 208.

The data model 211 may provide a schema to define CIs. The data model 211, for example, may include descriptions of a "model name" indicating the CI model, a "model attribute" indicating an attribute of a CI designated by the model name, and a "relation" between the CI designated by the model name and another CI. The data model 211 may further include a description of a "discovery method" for identifying a discovery instance, so as to detect a CI designated by the model name.

In certain embodiments, the discovery method may be identified by a discovery instance name. In the case of FIG. 2C, it is A-Discovery. The model attribute may be specified in accordance with an attribute specified in a data model such as "CDM," for example. In some embodiments, the administrator of the CMDB may freely designate attributes in the data model 211. A relation may be specified in accordance with the relations specified in the CDM, for example.

The discovery instance 212 may include descriptions of a "name" of the discovery instance, a "collection target" or "scope" of a management target (CI) collected by the discovery unit 201, a "collected attribute" and a "collected relation" of a management target (CI) collected by the discovery unit 201, and a "status" indicating whether the discovery instance is active or inactive. As the discovery method, a sensor conducting discovery may understand discovery means, and a CI and a relation to be created from information obtained by the discovery. The discovery unit 201 may use the discovery instance 212, for example, to conduct discovery. As a result of the discovery, a CI instance and a relation may be created, or a CI instance or a relation may be updated. In the case where the sensor conducting discovery understands a CI or a relation to be created using the discovered information, there may be no need to describe a discovery method defined by the data model 211. On the other hand, in the case where there is no sensor conducting discovery, discovery may be conducted while providing a description of a discovery method defined by the data model 211.

The CI instance 213 may include descriptions of an "instance name" to identify what CI the instance represents, a "model name" indicating what data model may be used to create the instance, an "attribute value" of each attribute identified by the data model, a description (value) of each "relation" identified by the data model, a "status" indicating whether the instance is active or inactive, and a "creation date" indicating when the CI instance is created. A CI instance may further include a CI instance identifier unique to the CI instance and able to distinguish the CI instance from another CI instance. In certain embodiments, a combination of a host name, a serial number, or a certain value, for example, may be used as the CI instance identifier. As shown in FIG. 2C, the CI instance 213 may include the following data: a CI instance name "Configuration Item A"; data model A (that may be used to render the CI as an instance); S, T, and U as attributes, each of which has a value; the relations used by M (usedBy: M), connecting with E (connectAt: E), and executed at H (runAt: H), a status indication that the CI instance is active, and the creation date of the CI instance.

The relation model 214 may provide a schema to define a relation identified by the data model 211. The relation model 214 may include descriptions of a "relation name" such as usedBy, a "target data model" to identify a data model as a target of the relation, and a "description" of the relation.

Figure 3A:
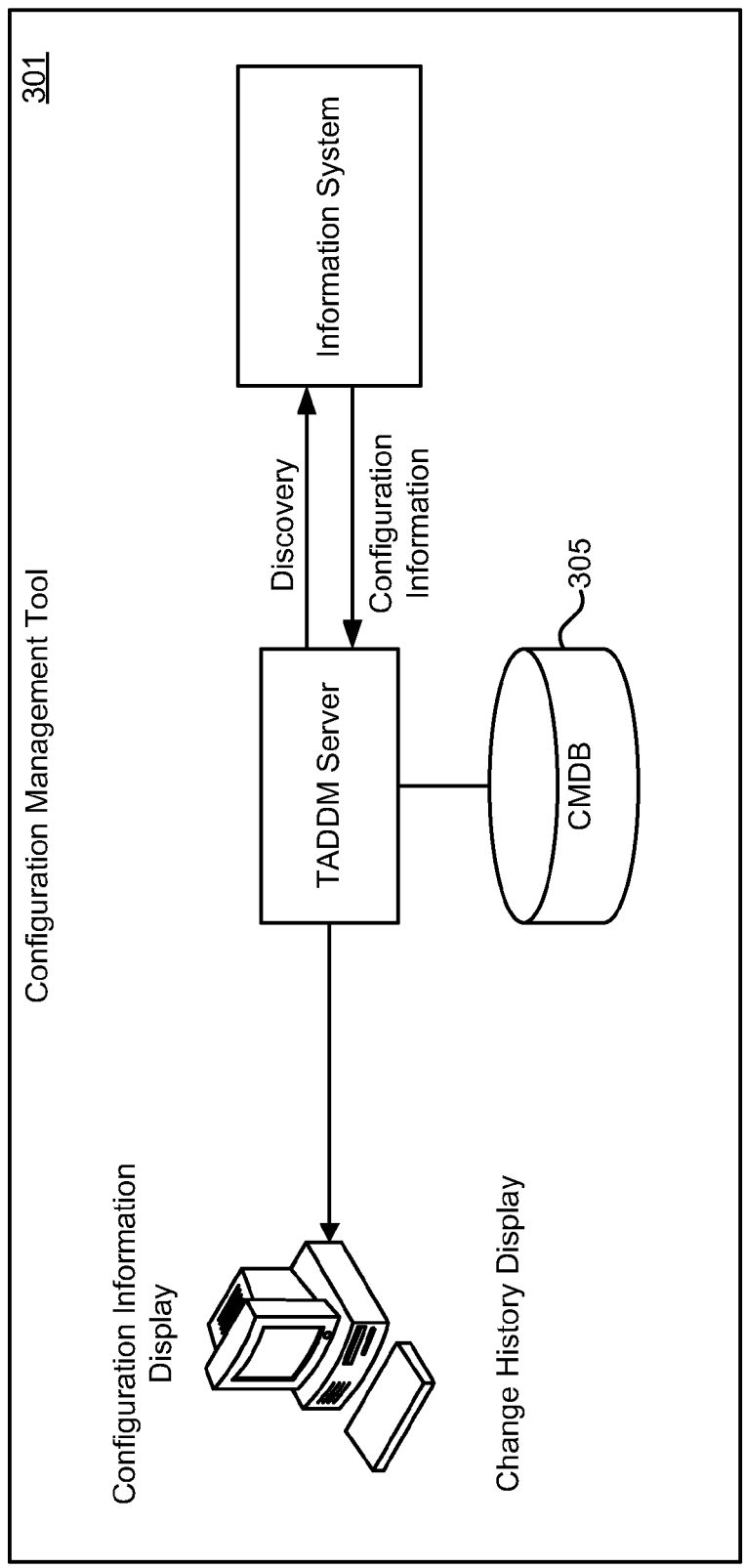
FIG. 3A illustrates one embodiment of a tool for configuration management in the CMDB.
Figure 3B:
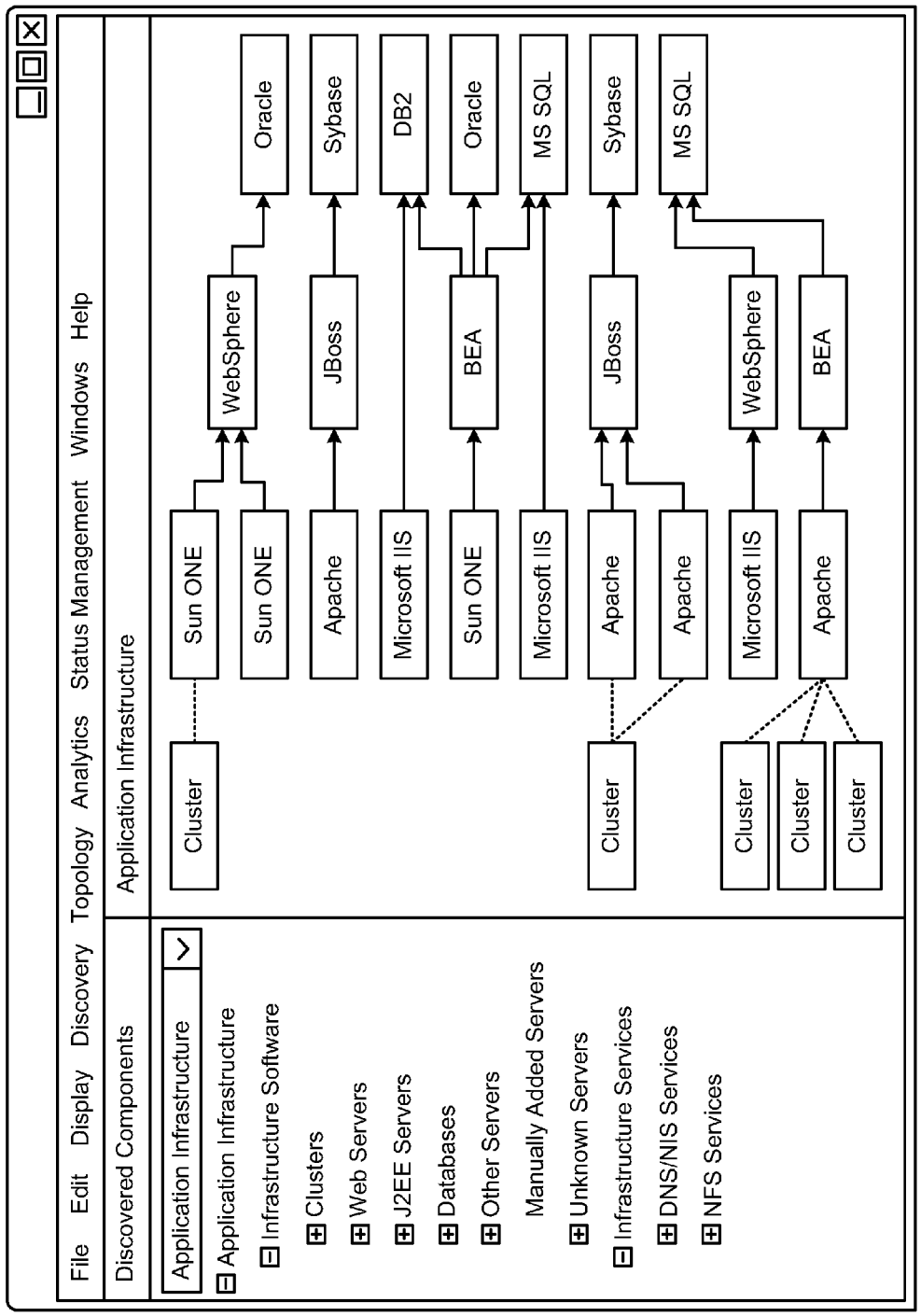
FIG. 3B illustrates an exemplary screen of the configuration information management in the CMDB in accordance with certain embodiments.

FIGS. 3A and 3B illustrate exemplary configuration management in a CMDB implemented in accordance with certain embodiments of the present invention. Specifically, FIG. 3A briefly illustrates a tool for configuration management in CMDB.

This tool 301 for configuration management may include a discovery function for automatically collecting information on a configuration item or items ("configuration information"), a topology function for displaying configuration information graphically, and an analysis function for conducting analysis of change history, configuration comparison and the like.

For instance, a TADDM server may acquire configuration information for an information system using ssh, SNMP, WMI, or the like. The configuration information may include a type of operating system of each information system, or the configuration thereof, and a type of application software or a configuration value thereof. The TADDM server may store the acquired information in the CMDB 305 as a CI instance. The TADDM server may send configuration information and change history information to a computer of the administrator based on the CI instance stored in the CMDB 305. The computer of the administrator may use the information to display the configuration information and the change history.

FIG. 3B illustrates an exemplary screen of the configuration information management in CMDB. A screen 309 of the configuration information management may be displayed with GUI. The display may be conducted using TADDM, for example. As shown in FIG. 3B, configuration items are application software. A relation between application software is indicated by solid lines. The names of application software displayed on the screen are trademarks of the respective companies and are provided by way of example and not limitation.

Figure 4A:
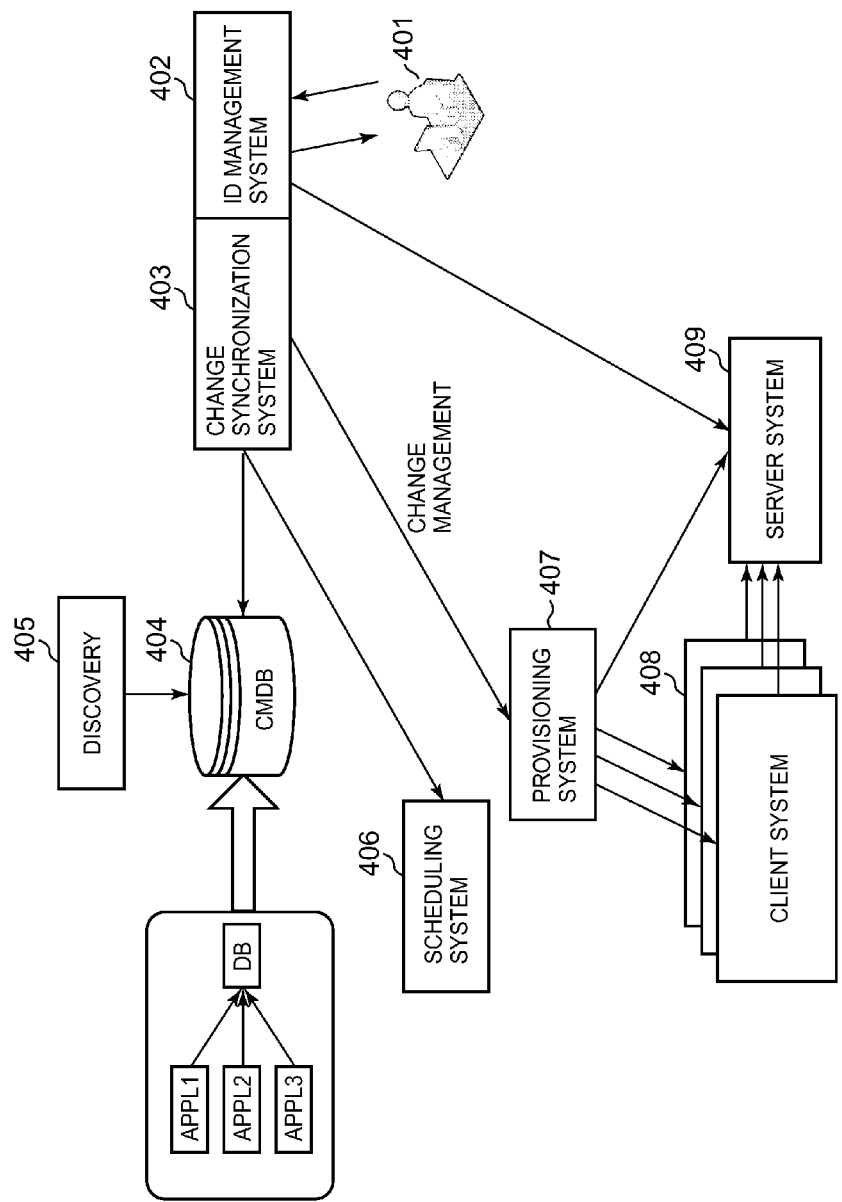
FIG. 4A illustrates an exemplary overall system to change authentication information using a CMDB in accordance with certain embodiments of the invention.
Figure 4B:
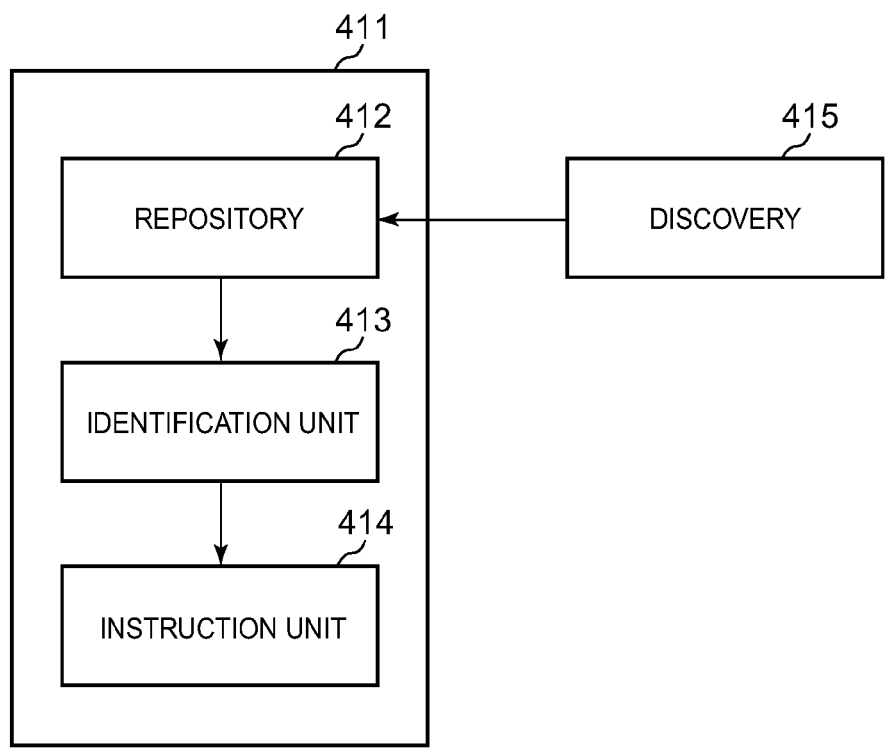
FIG. 4B is a block diagram illustrating functions of the system to change authentication information illustrated in FIG. 4A.
Figure 4C:
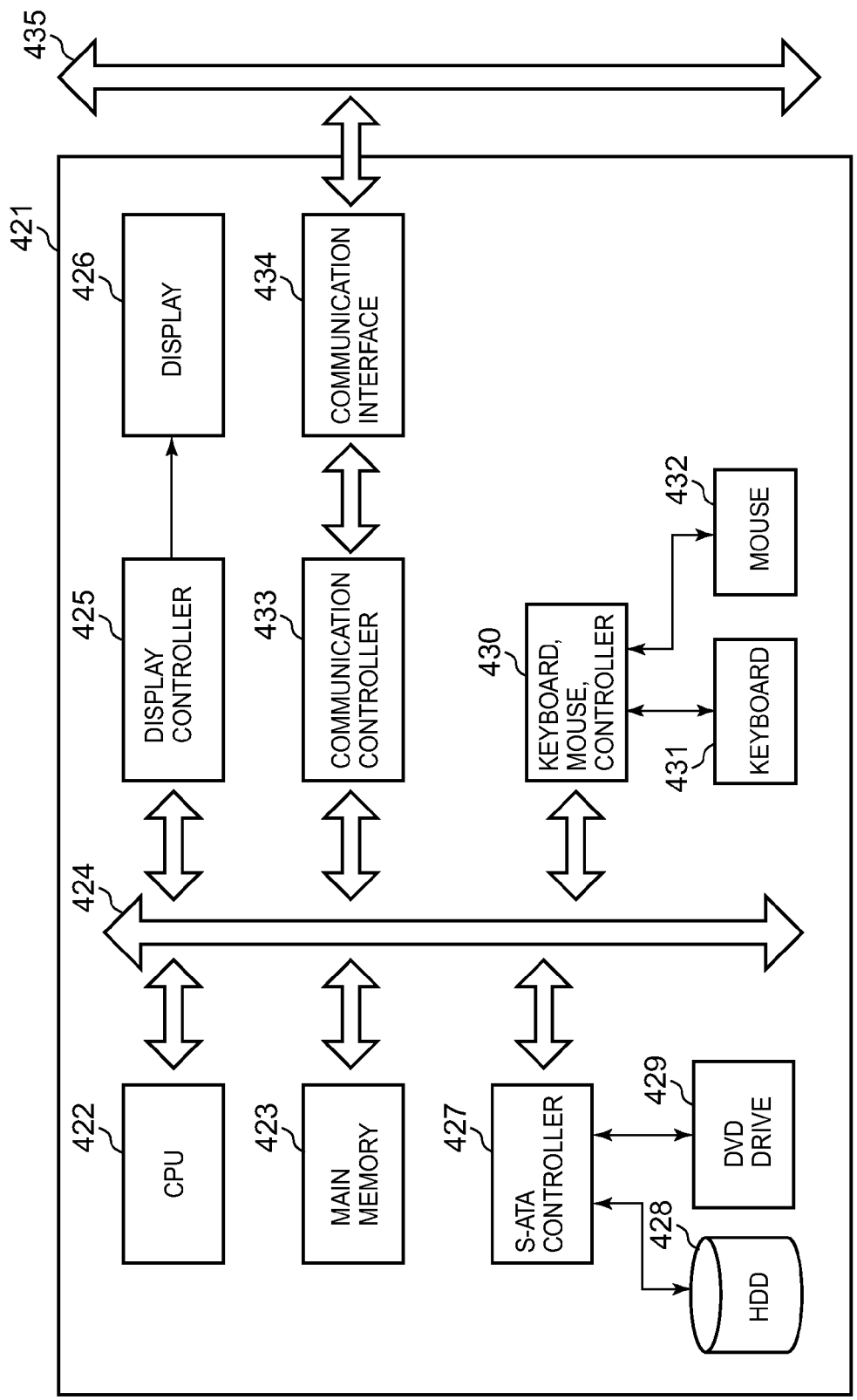
FIG. 4C is a block diagram of computer hardware in accordance with embodiments of the systems illustrated in FIGS. 4A and 4B.

FIGS. 4A to 4C illustrate a system to change authentication information and configuration items in accordance with certain embodiments of the present invention. FIG. 4A illustrates an exemplary overall system to change authentication information using a CMDB.

As shown, an administrator 401 may request an ID management system 402 to change authentication information on a server system 409. The ID management system 402 may request a change synchronization system 403 to identify a client system 408 influenced by the change of authentication information.

The change synchronization system 403 may use an attribute of a CI instance in a CMDB 404 or a relation, a combination thereof, or the like, to identify a client system 408 influenced by the change of authentication information. Dependence between the client system 408 and the server system 409 may be represented by a relation "AuthenticatedBy" in a CI instance of the client system 408, and may be indicated by a relation "Authenticates" in a CI instance of the server system 409. The change synchronization system 403 may be installed in the ID management system 402 as an extension of the ID management system 402. The attribute and the relation of the CI instance may be collected using a discovery unit 405. Further, in certain embodiments, the attribute and the relation of the CI instance may be updated using the attribute and relation update unit 204.

The CMDB 404 may store an attribute and a relation of a CI instance. The CMDB 404 may further include, as a relation between configuration items, authentication information between systems, e.g., dependence of a password. The dependence may be automatically collected by discovery, or manually input by the administrator. A dependence of authentication information between the client system 408 and the server system 409 may be indicated by a relation "AuthenticatedBy" in a CI instance of the client system 408, and may be indicated by a relation "Authenticates" in a CI instance of the server system 409. FIG. 4A illustrates that certain embodiments of a CMDB may store application software (APPL1 to 3) and respective CI instances and relations of database ("DB") systems.

The discovery unit 405 may detect CIs as a management target of the CMDB, e.g., information on the client system 408 and application operating on the client system 408, and the server system 409 and application operating on the server system 409. The discovery unit 405 may further detect information on a scheduling system 406.

The scheduling system 406 may manage the operation schedule of a job of the client system 408. The operation schedule may show "service providing time of the client system 408 is from Monday at 8:00 to Friday at 21:00," for example. Note here that the operation schedule may be stored in the CMDB 404 as an attribute of a CI instance of the client system 408. Therefore, the scheduling system 406 may be an optional configuration item in a system to change authentication information.

In some embodiments, the ID management system 402 may present to the administrator 401 a time period in which authentication can be changed, based on the operation schedule managed by the scheduling system 406, or an attribute of the CI instance of the client system 408 stored in the CMDB 404.

The administrator 401 may refer to the presented time period to facilitate determining a time when authentication information may be changed. The time when authentication information may be changed may be dictated by, for example, the next time period dedicated for change, or urgency, such as where there has been a leakage of authentication information. The administrator 401 may input the change time to the ID management system 402, which may notify the change synchronization system 403 of the change time.

The change synchronization system 403 may create a request for authentication information change based on notification of the change time, and may pass the created change request to a provisioning system 407. The provisioning system 407 may stop application software on the client system 408 during the change time described in the change request, and may change authentication information stored in the client system 408 to the authentication information described in the change request. In some embodiments, stopping the application software on the client system 408 may permit finishing the application software. Note here that, in some embodiments, the ID management system 402 (instead of the provisioning system 407) may change the authentication information stored in the client system 408 to the authentication information described in the change request.

After changing the authentication information stored on the client system 408, the provisioning system 407 may further change authentication stored in the server system 409. Note here that, in some embodiments, the ID management system 402 (instead of the provisioning system 407) may change the authentication information stored in the server system 409.

After changing the authentication information stored in the client system 408, the provisioning system 407 may restart the client system 408, or may re-execute the application software stopped on the client system 408. The client system 408 may send the changed authentication information to the server system 409 and request a connection.

FIG. 4B is a block diagram illustrating functions of the embodiment of the system illustrated in FIG. 4A. The embodiment of the system 411 illustrated in FIG. 4A to change authentication information includes a repository 412, an identification unit 413, and an instruction unit 414 to enable the change of authentication information. The repository 412 may be implemented by the CMDB 404, while the identification unit 413 may be implemented by the change synchronization system 403 illustrated in FIG. 4A. Similarly, the instruction unit 414 may be implemented by the ID management system 402, while the discovery unit 415 may be the same as the discovery unit 405 illustrated in FIG. 4A.

The system 411 may be placed in an environment that, in order to connect a client system 408 or application software (hereinafter "second configuration item") operating on the client system 408 with application software (hereinafter "first configuration item") operating on a server system 409, requests matching of authentication information ("first authentication information") for the first configuration item with authentication information ("second authentication information") transmitted from the second configuration item to the first configuration item for authentication.

The repository 412 may be prepared in a recording medium that the system 411 can access. The accessible recording medium may include a recording medium externally connected with the system 411, or a recording medium connected with the system 411 via a network, for example. The repository 412 may store a CI instance of a configuration item and a relation instance. The CI instance and the relation instance may be updated by discovery performed by the discovery unit 415. Updating of each instance may be conducted immediately before change of authentication information.

In response to a request for a change of authentication information (the first authentication information) for the first configuration item, the identification unit 413 may identify a second configuration item influenced by change of the first authentication information. This identification may be based on a relation in the CMDB. The second configuration item may be identified based on a relation instance between the first authentication information and the second authentication information, for example. Alternatively, in some embodiments, the second configuration item may be identified based on a relation instance for the first configuration item.

The identification unit 413 may further identify, based on an attribute of a CI instance in the CMDB, at least one operation schedule of the identified second configuration item (e.g., client system) and the first configuration item (e.g., server system). Based on each operation schedule of the identified second configuration item and the first configuration item, or each operation schedule of the second configuration item and the first configuration item managed by a job schedule system, the identification unit 413 may identify a time when the first authentication information, or the second and the first authentication information, can be changed.

The identification unit 413 may further permit a user to determine a time when the first authentication information or the second and the first authentication information can be changed, based upon each operation schedule of the identified second configuration item and the first configuration item, or based upon each operation schedule of the second configuration item and the first configuration item managed by a job schedule system.

The instruction unit 414 may instruct to change the authentication information (the second authentication information) transmitted from the second configuration item identified by the identification unit 413. The instruction of change may be conducted at the time determined by the identification unit 413. The instruction unit 414 may further instruct to change the first authentication information.

FIG. 4C is a block diagram of computer hardware of the embodiment of the system illustrated in FIGS. 4A and 4B. Specifically, a computer system 421 according to one embodiment of the present invention may include a CPU 422 and a main memory 423, which are connected with a bus 424. The CPU 422 may be based on 32-bit or 64-bit architecture, for example, Xeon® series, Core® series, Atom® series, Pentium® series, and Celeron® series of Intel Corporation, and Phenom® series, Athlon® series, Turion® series, Sempron® of AMD corporation, or the like.

A display 426, such as an LCD monitor, may be connected to the bus 424 via a display controller 425, for example. The display 426 may be used to display information on software operating on the computer system 421 with an appropriate graphic interface. A hard disk or a silicon disk 428 and a CD-ROM, DVD or a Blu-ray drive 429 may also be connected to the bus 424 via a IDE or SATA controller 427, for example. The CD-ROM, DVD or a BD drive may be used to introduce a program from a CD-ROM, a DVD-ROM or BD to the hard disk or the silicon disk 428 as needed. A keyboard 431 and a mouse 432 or other input device may also be connected to the bus 424 via a keyboard mouse controller 430 or a USB controller (not illustrated), for example.

The hard disk or the silicon disk 428 may store a program to provide a Java® processing environment such as an operating system and J2EE, an operation management program for CMDB, or other programs and data, which may be stored loadable to the main memory 423. In some embodiments, the operation management program may include TADDM.

A communication interface 434 may be based on Ethernet® protocol, for example, which may be connected with the bus 424 via a communication controller 433. The communication interface 434 may provide a physical connection between the computer system 421 and a communication line 435. In some embodiments, the communication interface 434 may communicate using TCP/IP communication protocol. The communication line may be a wired LAN environment or, in other embodiments, may be a wireless LAN environment based on a wireless LAN connection standard such as IEEE802.11a/b/g/n, for example.

Note that in addition to the network switch, a router, a hardware management console, and the like may be available as a network connection device to connect hardware, such as a computer or the like. That is, it may have a function of returning, in response to an inquiry using a predetermined command from a computer to which a network operation management program is introduced, configuration information such as an IP address of a computer connected therewith, and a MAC address. The network switch and the router may include an ARP table including a list of a pair of an IP address of a computer connected therewith and a corresponding MAC address for address resolution protocol ("ARP"), thus having a function of returning the content of the ARP table in response to an inquiry using a predetermined command. The hardware management console may return more detailed configuration information on a computer than that in the ARP table.

The hardware management console may be connected to the computer. This has a function of logically dividing one computer into a plurality of sections using Logical PARtition ("LPAR") and letting a different OS (such as Windows® and Linux®) to run in each section using VMware in the computer. An inquiry made to the hardware management console may systematically allow information in each logical section of a computer operating in LPAR/VMware to be obtained in detail.

FIGS. 5A to 5D illustrate a relation between configuration items used in an embodiment of the present invention and stored in the CMDB, a data model including the relation, a CI instance, and a relation model.

FIG. 5A illustrates the relations "AuthenticatedBy" and "Authenticates" on the CMDB between a client system and a server system in accordance with one embodiment of the present invention. For example, a relation of a CI instance of a client system 501 may include a relation "AuthenticatedBy" with a server system 502. Similarly, a relation of a CI instance of a server system 504 may include a relation "Authenticates" with a client system 503.

FIG. 5B illustrates an exemplary CI instance, data model and relation model of a client system including the relation "AuthenticatedBy" illustrated in FIG. 5A. In the case where authentication information is a password, for example, a data model 421 may include an attribute "PasswordChangeInformation." The attribute "PasswordChangeInformation" may indicate a change of the password that the client system presents to connect with a server system. A data model 411 may include a relation "AuthenticatedBy." This relation "AuthenticatedBy" may indicate that the client system requests authentication from the server system.

In the case where authentication information is a password, for example, a CI instance 423 may include an attribute value "Knowledge file name" concerning the attribute "PasswordChangeInformation." This attribute value may be a pointer to a method of changing authentication information in Knowledge, as discussed in more detail with reference to FIG. 6B below.

A relation model 414 may define the relation "AuthenticatedBy." The relation model 414 may further define a target data model as A, C and D.

As shown in FIG. 5B, a CI instance itself may include a relation. Although the CI instance itself may include a relation, in some embodiments relation instances (corresponding in number to the number of relations) may be created apart from the CI instance, as illustrated in FIG. 5D.

FIG. 5C illustrates an exemplary CI instance, data model and relation model of a server system, including the relation "Authenticates" illustrated in FIG. 5A. In the case where authentication information is a password, for example, a data model 431 may include an attribute "PasswordChangeInformation." The attribute "PasswordChangeInformation" may identify a change of a password for a server system. The data model 431 may further include a relation "Authenticates."

The relation "Authenticates" may indicate that authentication is permitted to the client system.

In the case where authentication information is a password, for example, a CI instance 433 may include an attribute value "Knowledge file name" about the attribute "PasswordChangeInformation." The attribute value "Knowledge" may be a pointer to a method of changing authentication information in Knowledge, as discussed in more detail below with reference to FIG. 6B.

A relation model 434 may define the relation "Authenticates." The relation model 434 may further define that a target data model is B.

As shown in FIG. 5C, a CI instance itself may include a relation. As previously mentioned, although the CI instance itself may include a relation, a number of relation instances corresponding to the number of relations may be created apart from the CI instance, as illustrated in FIG. 5D.

FIG. 5D illustrates the exemplary relation model "Authenticates," such as that illustrated in FIG. 5C, and a relation instance thereof. As shown, the relation model 441 is a model about the relation "Authenticates." In the case where a relation instance is used, a relation in the reverse direction can be represented by exchanging an origin and a destination, and therefore relations in both directions may be indicated using one relation model and a relation instance.

The relation model 441 may include each definition of "model as an origin" and "model as a destination" of the relation "Authenticates." The model as the origin of the relation model "Authenticates" may include a data model about a server system that is authenticated, and the model as the destination may be a data model about a client system that authenticates.

To indicate that the relation is a one-to-one relation, a one-to-many relation, or a many-to-many relation, the relation model 441 may further include a definition concerning each number of the base-point side and the destination side.

A relation instance 443 may further include a "relation model name" indicating what a relation is, and a value indicating each CI instance as an origin and a destination of the relation. Since a relation model name in a forward direction and a relation model name in a backward direction may have one-to-one correspondence, in some embodiments an instance may only include a model name in a forward direction.

Figure 6A:
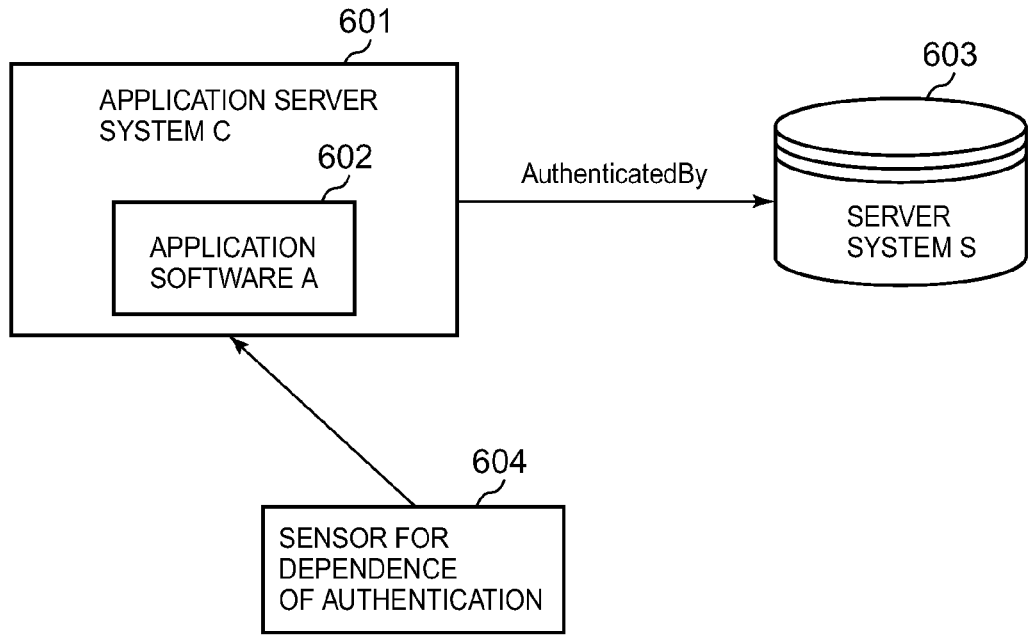
FIG. 6A illustrates one embodiment of a sensor used for discovering dependence of authentication in a CMDB in accordance with certain embodiments of the invention.
Figure 6B:
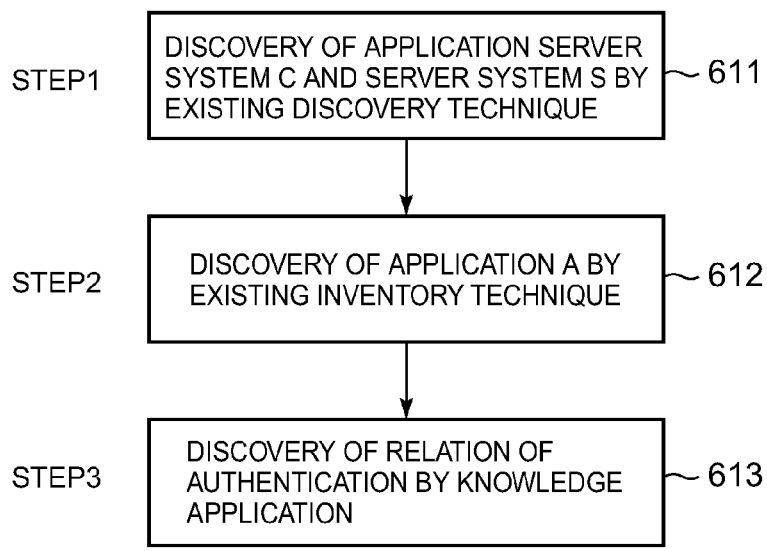
FIG. 6B illustrates one embodiment of a method for discovering an authentication relation using the sensor of FIG. 6A.

FIGS. 6A to 6C illustrate a method to conduct discovery of an authentication relation, and a sensor, knowledge and signature used in the method in accordance with one embodiment of the present invention. FIG. 6A illustrates one embodiment of a sensor that may be used for discovery of a dependence of authentication in the CMDB.

As shown, on an application server system C 601, application software A 602 may be installed for operation. In order to connect with a server system S 603, the application software A 602 may transmit authentication information (such as an ID and a password) to the server system S 603. In response to a verification request for authentication information from the application software A 602, the server system S 603 may verify the authentication information transmitted from the application software A 602. A sensor 604 for a dependence of authentication may acquire a property file of the application software A 602 based on knowledge (see FIG. 6C), and may acquire a DB name from a key thereof.

FIG. 6B illustrates one embodiment of a discovery method for an authentication relation using a sensor such as that described above with reference to FIG. 6A.

Knowledge of an authentication method of application software may be defined, whereby a dependence of the authentication information of the application software and a server system may be automatically discovered. In some embodiments, the discovery procedure may include three steps:

Step 1 611: Discovery of an application server system C 601 and a server system C 603 in accordance with any discovery technique known to those in the art.

Step 2 612. Discovery of application software A 602 in accordance with any discovery technique known to those in the art.

Step 3 613. Discovery of a relation of authentication by knowledge application in accordance with one embodiment of the present invention. The knowledge required for discovery in Step 3 613 may include information regarding the server systems for which certain application software conducts authentication. The knowledge may further include the name of the server system.

In detail, Step 1 611 may include a discovery technique that enables detection of the existence of the application server system C 601 and the server system S 603, where an instance of each CI of the application server system C 601 and the server system S 603 may be recorded in the CMDB. Similarly, this discovery technique may enable detection that the application server system C 601 and the server system S 603 have a relation based on a situation of the network connection, which relation may also be recorded in the CMDB. In certain embodiments, a technique installed in IBM Tivoli Application Dependency Discovery Manager® may be used for this purpose.

At Step 2 612, in a system to which the application server system C 601 may be introduced, inventory may be conducted using signature. The inventory of the application software installed using signature may be installed as a software inventory function of IBM Tivoli Provisioning Manager® V5, for example. The inventory procedure of the application software may enable detection of the application software A 602. A CI instance of the application software A 602 may be created, and a relation between the application server system C 601 in operation and the application software A 602 may be recorded in CMDB. The relation between the application server system C 601 and the application software A 602 may be "C has A," for example.

At Step 3 613, the knowledge of the authentication relation may be applied to the application software A 602, whereby the sensor 604 for a dependence of authentication may acquire a property file bbb of the application software A 602 based on the knowledge, so that a DB name may be acquired from a key aaa thereof. The sensor 604 for a dependence of authentication may confirm that the acquired DB name exists on the server system S 603, whereby a relation instance of the application software A 602 conducting authentication with respect to the server system S 603 may be registered in the CMDB. The relation instance may be "S authenticates A," for example.

FIG. 6C is a conceptual diagram of one embodiment of a signature and knowledge that may be used in the discovery method for the authentication relation illustrated in FIG. 6B. A signature 621 may include an application software name and signature, for example. Another signature 622 may be an exemplary signature used in inventory using the signature. The signature 622 about product A in the upper column shows that whether product A provided by vendor IBM is installed or not may be determined based on whether directory yyyy exists in server zzzz, under which file xxxx exists.

The signature 623 about product B in the lower column shows that whether product B provided by vendor YY is installed or not may be determined based on whether registry www\YY key exists, under which a value vvv of type DWORD exists.

In some embodiments, knowledge 625 may include an application software name, an authentication counter, an authentication method, and an authentication target. The authentication target may be authentication information, e.g., information that is necessary to change a password.

As shown, knowledge 625 about product A indicates that product A provided by vendor IBM may conduct authentication for a DB server in the first record (authentication counter), authentication for the DB may be conducted using a password in the next record (authentication method), and property file bbb may be acquired and a value of a DB name key aaa therein may be read out in the final record (authentication target), whereby the DB name to be authenticated may be judged.

Knowledge 626 about product B indicates that product B provided by vendor YY may conduct authentication for a DB server in the first record (authentication counter), authentication for the DB may be conducted using a password in the next record (authentication method), and the DB name recorded in registry may be determined in the final record (authentication target).

Figure 7A:
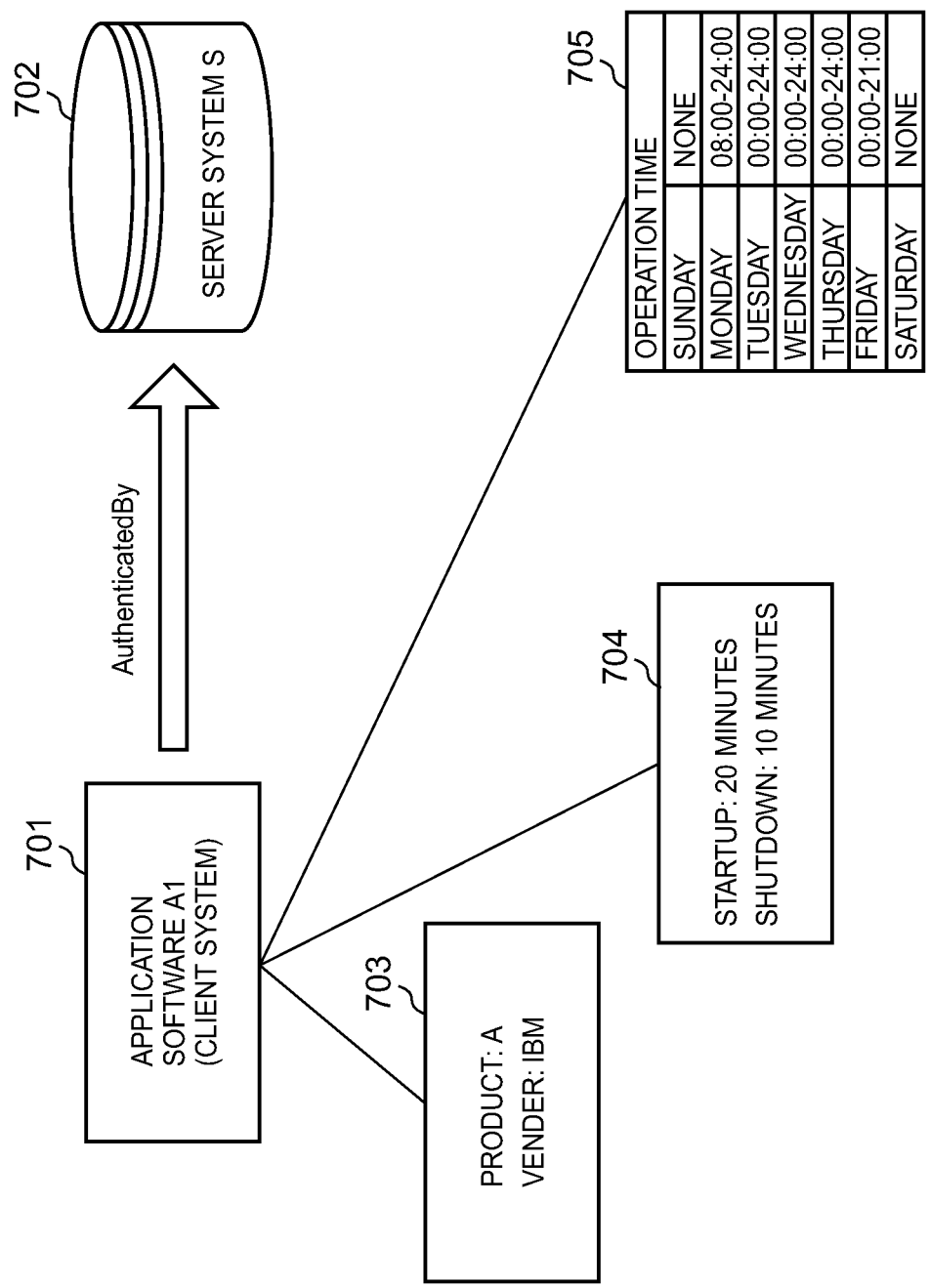
FIG. 7A illustrates one embodiment of a system to change authentication information in accordance with the present invention.

FIG. 7A illustrates an embodiment of a system configuration to change authentication information, and data associated therewith. As shown, a client system 701 may execute application software A1. The application software A1 may transmit authentication information to a server system S 702 in order to use data in a server system S 702.

An authentication relation of the client system 701 with the server system S 502 may be defined in CMDB as "AuthenticatedBy" the CI of the application software A1, as described above with reference to FIGS. 5A and 5B.

The application software A1 may be application software in an operation unit such as an inventory control system. In the case where the application software A1 is implemented using a product of a vendor: IBM: product A 703, a CI instance of the application software A1 may include a relation of the application software A1 being implemented using product A. The relation may be defined by "runsAt" and "runsOn," for example. The relation may be for stopping or starting WAS to change authentication information, for example.

The CI instance of the application software A1 may have, as attributes, a time (startup) required to start the application software A1, and a time (shutdown) required to finish the application software A1. As shown in FIG. 7B, an attribute value of the attribute "startup" may be "20 minutes," and an attribute value of the attribute "shutdown" may be "10 minutes." In some embodiments, these attribute values may be manually input by the administrator.

An operation time table 705 may be used to automatically detect a time period during which authentication information may be changed. The operation time table 705 may include data on an operation time of each day of the week.

FIG. 7B illustrates an exemplary CI instance, data model and relation model of the application software A1 illustrated in FIG. 7A. The data model 711 may include "StartUp" and "ShutDown," in addition to attributes residing in model attributes of a data model 421 such as that shown in FIG. 5B. The attribute "StartUp" may define a time (startup) required to start the application software A1. The attribute "ShutDown" may define a time (shutdown) required to finish the application software A1.

A CI instance 713 may include attribute values of "StartUp" and "ShutDown," in addition to those attributes of the CI instances 423 shown in FIG. 5B. In the CI instance 713, an attribute value of the attribute "startup" of the application software A1 may be "20 minutes," and the attribute value of the attribute "shutdown" of the application software A1 may be "10 minutes."

FIG. 7C illustrates one embodiment of knowledge that may be used to change the authentication information illustrated in FIG. 7A. Knowledge may be used to change authentication information of the client system in synchronization with a change of authentication information of the server system.

In certain embodiments, knowledge may record therein, for example, application software information, an authentication method, whether stopping of the application is necessary or not, a stop processing method and a start processing method of the application software, a time required to change authentication information, a method to change authentication information (e.g., password), and/or the like. Knowledge is depicted in FIG. 7C as a first table 721 and a second table 722 for convenience, although the tables may be combined into a single table in some embodiments.

"Application information" may include a name of application software and a vendor name that provides the application software. "Authentication method" may define an authentication method used by the client system to connect with the server system. The authenticate method may be a password or a digital certificate, for example.

"Application stop needed?" indicates whether the stopping of application software is necessary to change authentication information on the client system side, and in the case where the stopping of the application is not necessary, there may be no need to describe the stop processing method and the start processing method. In some embodiments, a determination of whether stopping of the application is necessary may be indicated by "Yes" or "No," for example.

"Application stop processing method" may describe a method to stop application software before the authentication information is changed. The stopping method may be conducted automatically, semi-automatically, manually, or by any other method known to those in the art. "Application start processing method" may describe a method to start application software after authentication information has been changed. The starting method may be conducted automatically, semi-automatically or manually, or by any other method known to those in the art.

"Change necessary time" may describe a time required to change a password on the client side to enable automatically searching for a time period available to accommodate such a change, such as a time that may not affect a service-providing time period. In certain embodiments, the required change time or duration may be summed with a time required to finish and start the application so as to facilitate determining an available period of time to accommodate the entire process needed to change authentication information on the client system side.

In certain embodiments, knowledge may be stored as metadata in a CMDB 404, and as knowledge in the change synchronization system 403. In the case where knowledge is stored as metadata in the CMDB 404, a pointer to a certain point in knowledge (e.g., knowledge concerning product A of IBM) may be indicated in an attribute of a CI instance about the client system. The metadata of knowledge may be prepared in the CMDB 404 as a sub-CI instance of a CI instance about the client system.

As for general application software, knowledge may be provided by a provider of application software, e.g., IBM. The provider of the application software may provide, in addition to knowledge, a stop processing method and a start processing method of the application software, a method to change authentication information, and data of the method to change authentication information. This may be provided not only as operation procedure in a form that a user can read, but also in a form that can be used in an operation automation product, e.g., a format that can be used in Tivoli Provisioning Manager®.

As for application software (self-developed product) developed uniquely without using general application software, a developer of the uniquely-developed application software may provide the administrator with knowledge. In certain embodiments, authentication information of the server system may be changed using an existing TIM as well.

Figure 7D:
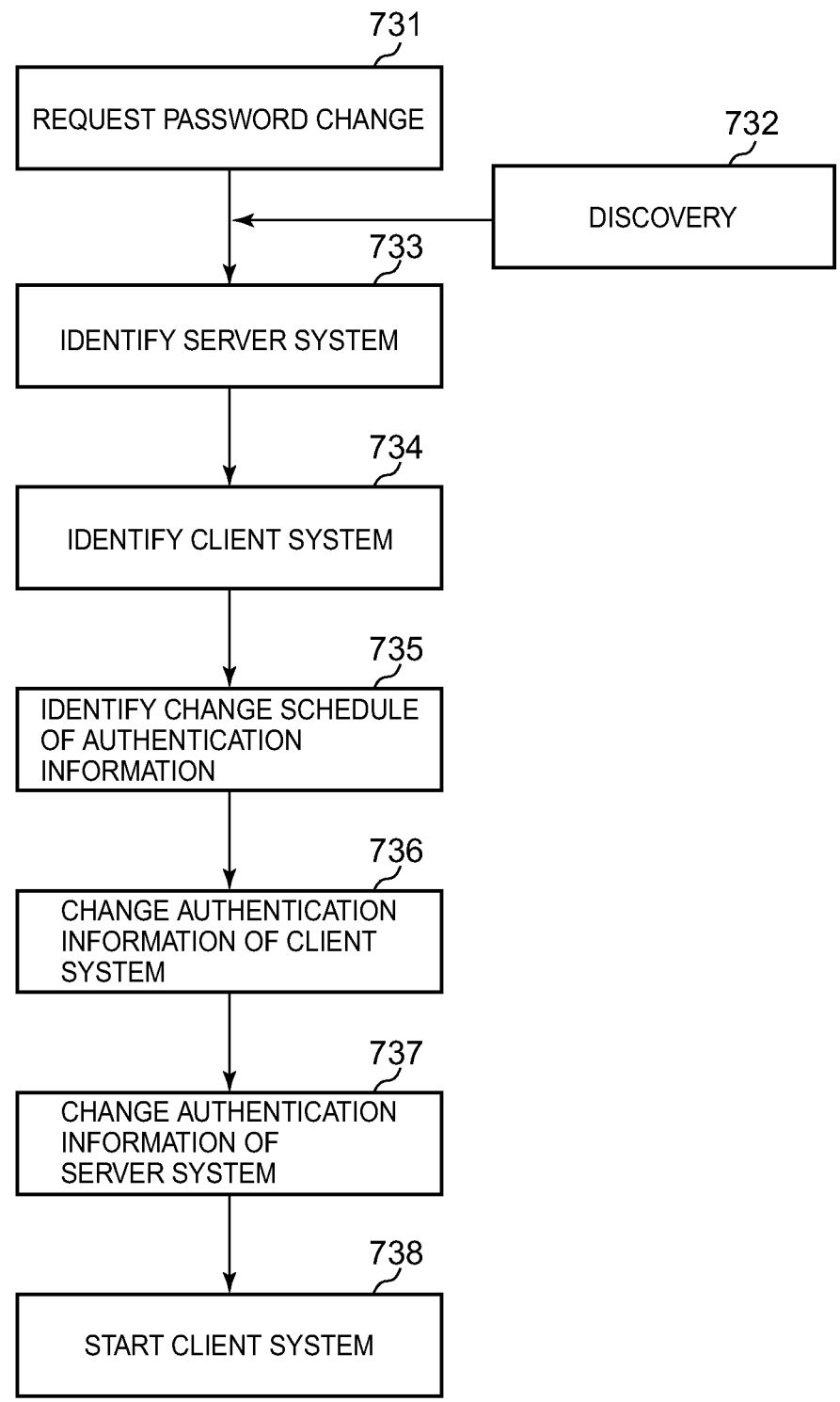
FIG. 7D is a flowchart of an embodiment of a process to change authentication information for the system of FIG. 7A.

FIG. 7D is a flowchart of a process to change authentication information in accordance with the embodiment of the present invention provided in FIG. 7A. Particularly, at Step 731, an administrator 401 may request that an ID management system 402 change a password for a server system S 702. At Step 732, in response to the request for password change, a discovery unit 201 may conduct discovery. The discovery may allow an attribute or a relation of configuration items to be updated.

At Step 733, a change synchronization system 403 may identify a CI instance of the server system S 702 among information from the ID management system 402. As a result, the server system S 702 may be identified. At Step 734, a relation between CI instances of a server system S 802 may be used to identify a client system or application software on the client system.

At Step 735, the change synchronization system 403 may identify a schedule to change authentication information. An operation time table 705 of application software A1 may be referred to enable selecting a schedule from a time period other than operation time, with consideration given to the time (startup) to start the application software A1 and the time (shutdown) to finish such.

At Step 736, a provisioning system 407 may change authentication information of the client system (or application software on the client system) in accordance with the schedule. At Step 737, the provisioning system 407 may change authentication information of the server system (or application software on the server system) in accordance with the schedule. As with all steps of a method in accordance with the invention, Steps 736 and 737 may be conducted in reverse or another order, or may be conducted at the same time. At Step 738, the client system, or the application software on the client system, may be started.

Figure 8A:
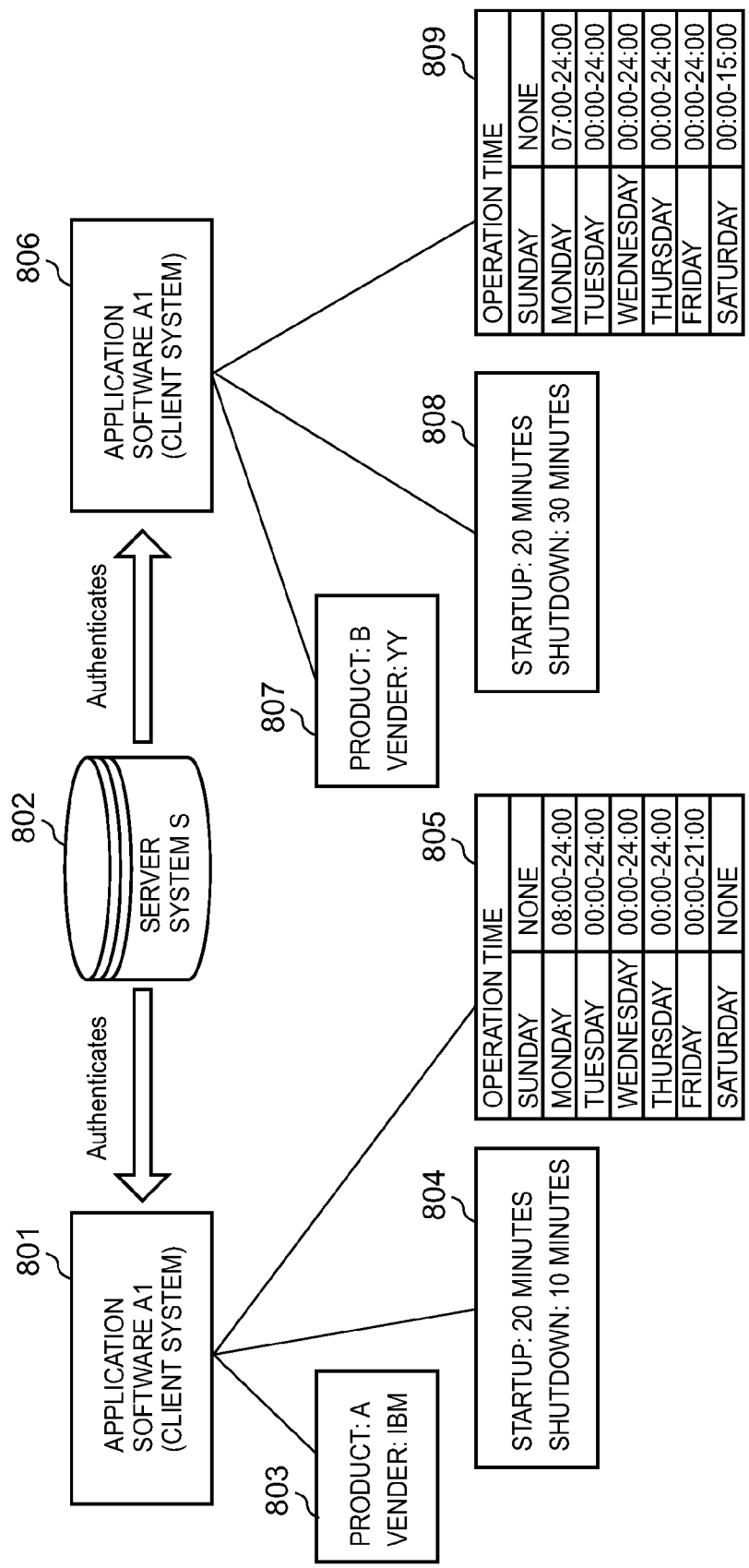
FIG. 8A illustrates another embodiment of a system to change processing of authentication information.

FIG. 8A illustrates another embodiment of a system application to which change processing of authentication information may be conducted. For comparative purposes, steps 801 to 805 of FIG. 8A may roughly correspond to steps 701 to 705, respectively, of FIG. 7A.

The following describes the case where an administrator 401 requests an ID management system 402 to change a password for a server system S 802. A change synchronization system 403 may use an attribute to identify a CI instance of the server system S 802, e.g., a host name (S) from the information from the ID management system 402, to identify the CI instance about the server system S 802 in the CMDB 404. The change synchronization system 403 may further search a CI instance associated with the server system S 802 with a relation "Authenticates" in the CMDB 404. As shown in FIG. 8A, application software A1 801 and application software A2 806 may be identified in the CMDB 404 as a result of the search.

Figure 8B:
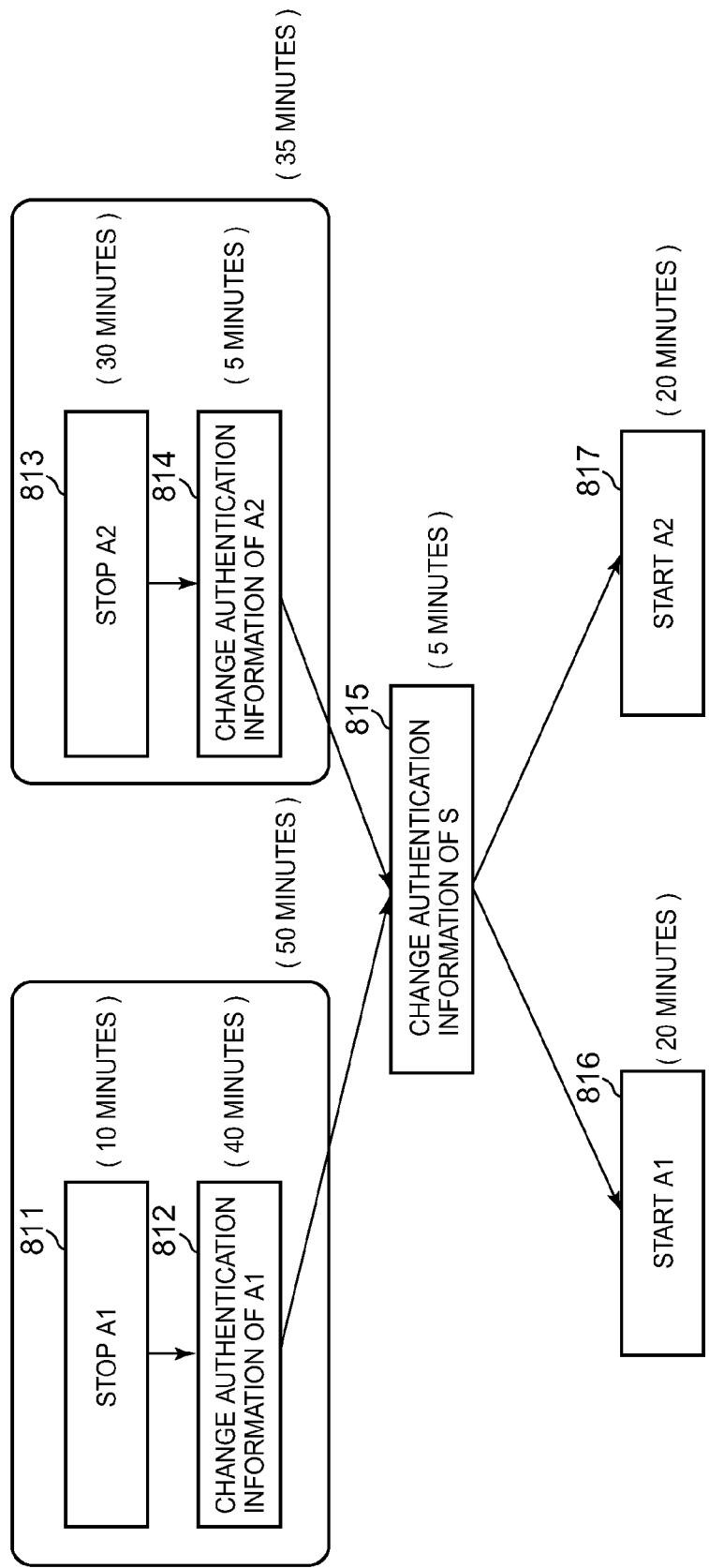
FIG. 8B illustrates one embodiment of a process flow created from the search for a relation of authentication information in the system of FIG. 8A.

FIG. 8B illustrates one embodiment of a process flow created from the search result for a relation of authentication information, such as that described above with reference to FIG. 8A. Particularly, the change synchronization system 403 may internally create the process flow of FIG. 8B from the search result of the relation "Authenticates," and may calculate the total necessary time required to change authentication information.

In certain embodiments, it may take five minutes to change authentication information 815 of the server system S (or the application software operating on the server system 802). In the case where the provisioning system 407 may conduct the processing of the application software A1 and A2 at the same time, the time required to change authentication information may be seventy-five (75) minutes (see 811+812+815+816) for the application software A1, and sixty (60) minutes (see 813+814+815+817) for the application software A2.

In the case where the provisioning system 406 cannot conduct the processing of the application software A1 and A2 at the same time, the time required to change authentication information may be one hundred thirty (130) minutes (see 811+812+813+814+815+816+817).

The following describes an example where processing of the application software A1 and A2 may be conducted at the same time. Particularly, the change synchronization system 403 may search the range where the total of seventy-five (75) minutes (the time required to change authentication information for application software A1) and sixty (60) minutes (the time required to change authentication information for application software A2) may be included in a common time period other than the operation time 805 of the application software A1 and the operation time 809 of the application software A2.

As a result of the search, the change synchronization system 403 may determine that change processing for the application software A1 may be started from Friday 9 PM to Monday 6:45 AM, and that for the application software A2 may be started from Saturday 3 PM to Monday 6 AM. As a result of this determination, the change synchronization system 403 may determine that a change processing of authentication information of both the application software A1 and A2 and the server system S 802 may be started from Saturday 3 PM to Monday 6:45 AM. In this manner, the common time period may be other than the operation time 805 of the application software A1 and the operation time 809 of the application software A2. The determination result may be displayed on a display of the administrator 401.

In some embodiments, the determination may be stored in the change synchronization system 403 or in the CMDB, as each attribute value of a CI instance of the application software A1 and a CI instance of the application software A2, as well as a CI instance of the server system S 802.

The change synchronization system 403 may create a change request including the following steps. The change synchronization system 403 may pass to the provisioning system 407 a series of change requests (as provided below) for authentication information, as well as the time when the change of authentication information is to be started. After the change request is approved by a change management process, the change system may pass the change request to the provisioning system 407. The change management process may refer to a process conducted in accordance with ITIL. In the change management process, an approval process of the change request may be conducted by a change management process management server, for example. The approval may be conducted by a change manager (person) and a change advisory committee. The series of change requests may include, for example:

1. stop of application software A1 and A2;
2. change of authentication information of application software A1 and A2;
3. change of authentication information of server system S; and
4. start of application software A1 and A2.

In some embodiments, when the processing of the application software A1 and A2 cannot be conducted at the same time, a series of change requests for authentication information (as outlined below) may be passed when the change of authentication information is to be started.

1. stop of application software A1;
2. stop of application software A2;
3. change of authentication information of application software A1;
4. change of authentication information of application software A2;
5. change of authentication information of server system S;
6. start of application software A1; and
7. start of application software A2.

Note here that FIG. 8B illustrates one embodiment of a process flow of changing authentication information of the server system S 802 after changing authentication information of application software A1 and A2. In some embodiments, however, authentication information of application software A1 and A2 may be changed after changing authentication information of the server system S 802.

In certain embodiments, authentication information of the server system S 802 may be changed without any error and without stopping the application software A1 and A2 when the application software A1 and A2 has a connection pool with the server system S 802. In this case, the change synchronization system 403 may pass to the provisioning system 407 a series of change requests for authentication information in the following, as well as the time when the change of authentication information is to be started. After the change request is approved by a change management process, the change system may pass the change request to the provisioning system 407.

In the case where the processing of the application software A1 and A2 may be conducted at the same time:

1. change of authentication information of server system S;
2. stop of application software A1 and A2;
3. change of authentication information of application software A1 and A2; and
4. start of application software A1 and A2.

In the case where the processing of the application software A1 and A2 cannot be conducted at the same time:

1. change of authentication information of server system S;
2. stop of application software A1;
3. stop of application software A2;
4. change of authentication information of application software A1;
5. change of authentication information of application software A2;
6. start of application software A1; and
7. start of application software A2.

Figure 8C:
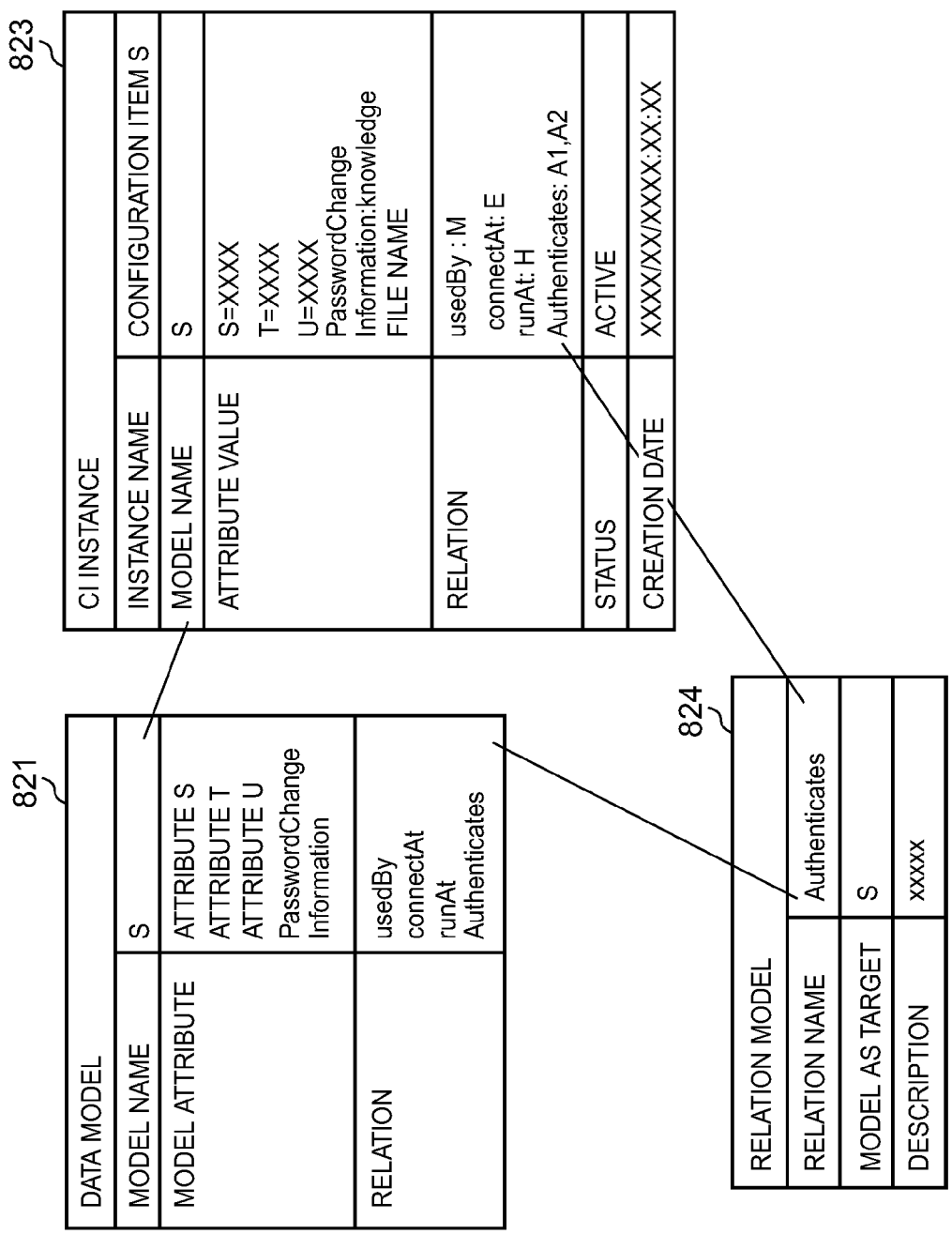
FIG. 8C illustrates an exemplary CI instance, data model and relation model for the embodiment of the server system of FIG. 8A.

FIG. 8C illustrates an exemplary CI instance, data model and relation model in accordance with the embodiment of the server system S illustrated in FIG. 8A. As shown, a data model 821 may roughly correspond to the model of the data model 431 illustrated in FIG. 5C. A CI instance 823 may correspond to the CI instance 433 of FIG. 5C. An attribute "Authenticates" of the CI instance 823 may include, as attribute values, "A1" indicating to approve the application software A1, and "A2" indicating to approve the application software A2. A relation model 824 may correspond to the relation model 432 of FIG. 5C.

Figure 8D:
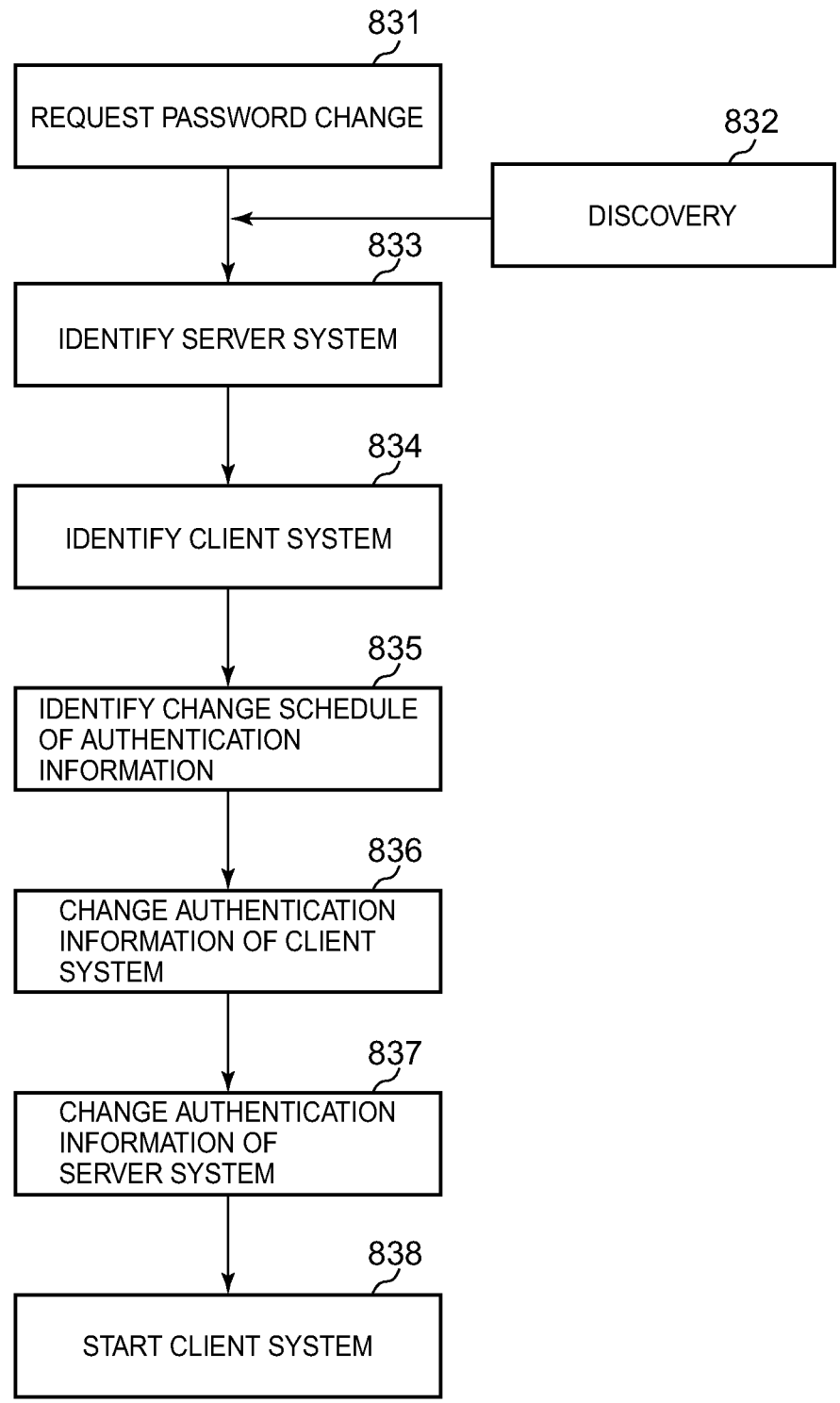
FIG. 8D is a flowchart of a process to change authentication information for the embodiment shown in FIG. 8A.

FIG. 8D is a flowchart of another embodiment of processing to change authentication information in accordance with the embodiment of the present invention described with reference to FIG. 8A.

Specifically, at Step 831, an administrator 401 may request that an ID management system 402 change a password for a server system S 802. At Step 832, in response to the request for password change, a discovery unit 201 may conduct discovery. The discovery may allow an attribute or a relation of configuration items to be updated.

At Step 833, a change synchronization system 403 may identify a CI instance of the server system S 802 among information from the ID management system 402. As a result, the server system S 802 may be identified. At Step 834, a relation between CI instances of a server system S 802 may be used to identify application software A1 and A2 on a client system.

At Step 835, the change synchronization system 403 may identify a schedule to change authentication information. At Step 836, a provisioning system 407 may change authentication information of the client system or application software on the client system in accordance with the schedule. At Step 837, the provisioning system 407 may change authentication information of the server system, or application software on the server system, in accordance with the schedule. As with all method steps, note here that Steps 836 and 837 may be conducted in reverse order, at the same time, or in any other order known to those in the art.

At Step 838, the client system, or the application software on the client system, may be started.

Figure 9A:
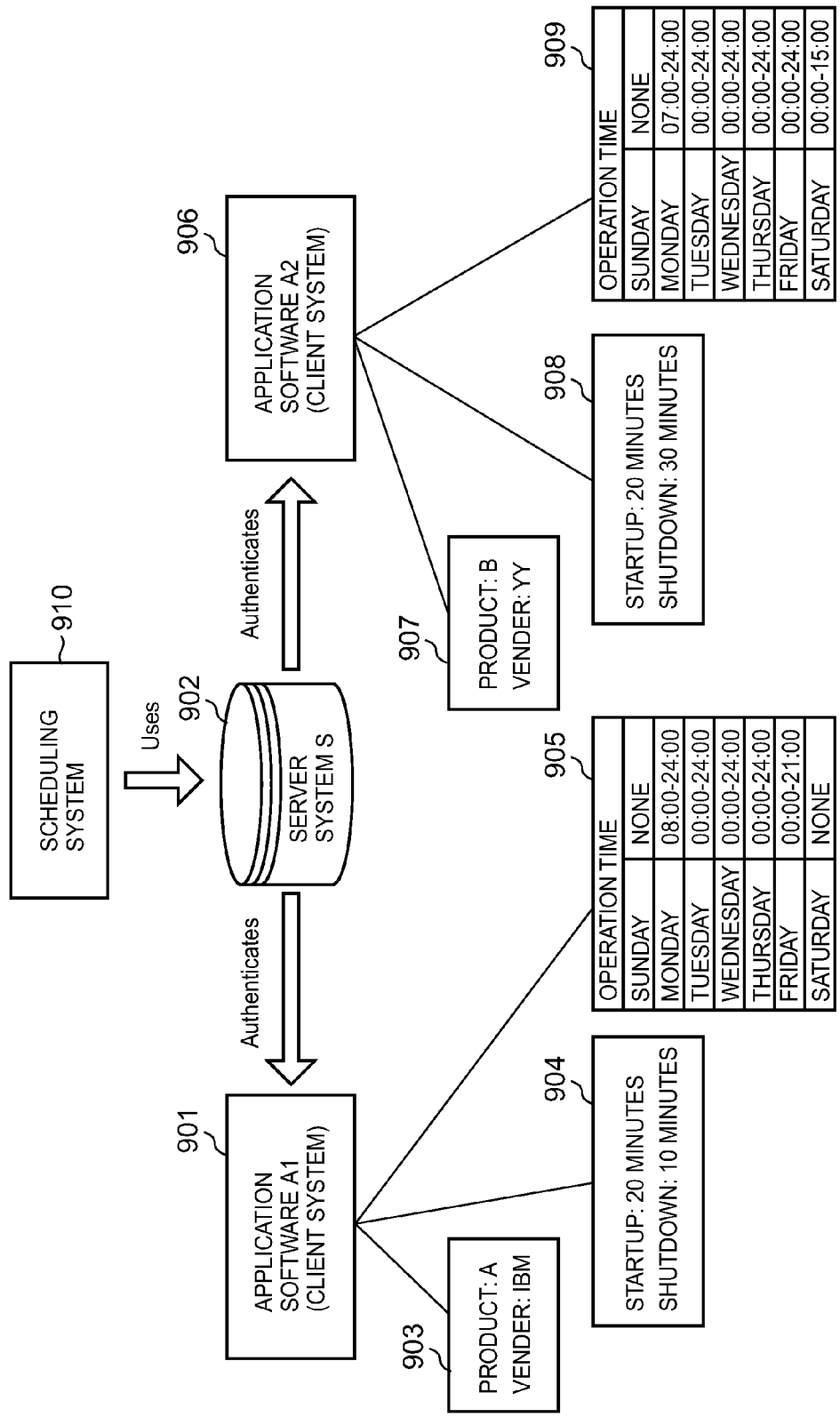
FIG. 9A illustrates another embodiment of a system to change processing of authentication information, where a server system S is also used in a batch job.

FIG. 9A illustrates an exemplary system application to which change processing of authentication information may be conducted so as to also use a server system S in a batch job in accordance with a third embodiment of the present invention.

For convenience, elements 901 to 909 of FIG. 9A roughly correspond to elements 801 to 809, respectively, of FIG. 8A.

In the case where a server system S 902 is used also in a batch job, schedule of a job may be recorded in a scheduling system 910 of the job, as well as a relation with the server system S 902, e.g., "Uses" from the batch job. The relation "Uses" may be recorded as an attribute of a CI instance of the job in CMDB. The relation may be used to detect a batch job using the server system S 902 from the job to be executed, detect a batch job whose authentication information is to be changed, and exclude an execution time period of job from a time period when authentication information can be changed.

In the case where the server system S 902 is not used in a batch job, as described with reference to FIG. 7D, the administrator may be notified that change processing of authentication information of the application software A1 and A2 and the server system S can be started from Saturday 3 PM to Monday 6 AM.

Note here that in the case where a batch job is not associated with the CMDB, for example, or in the case where the schedule of the batch job is not associated with another system, the administrator may designate an execution timing to change authentication information. This designation may be based on determination of a common time period, as described with reference to FIG. 7D, with consideration given to the batch job.

Figure 9B:
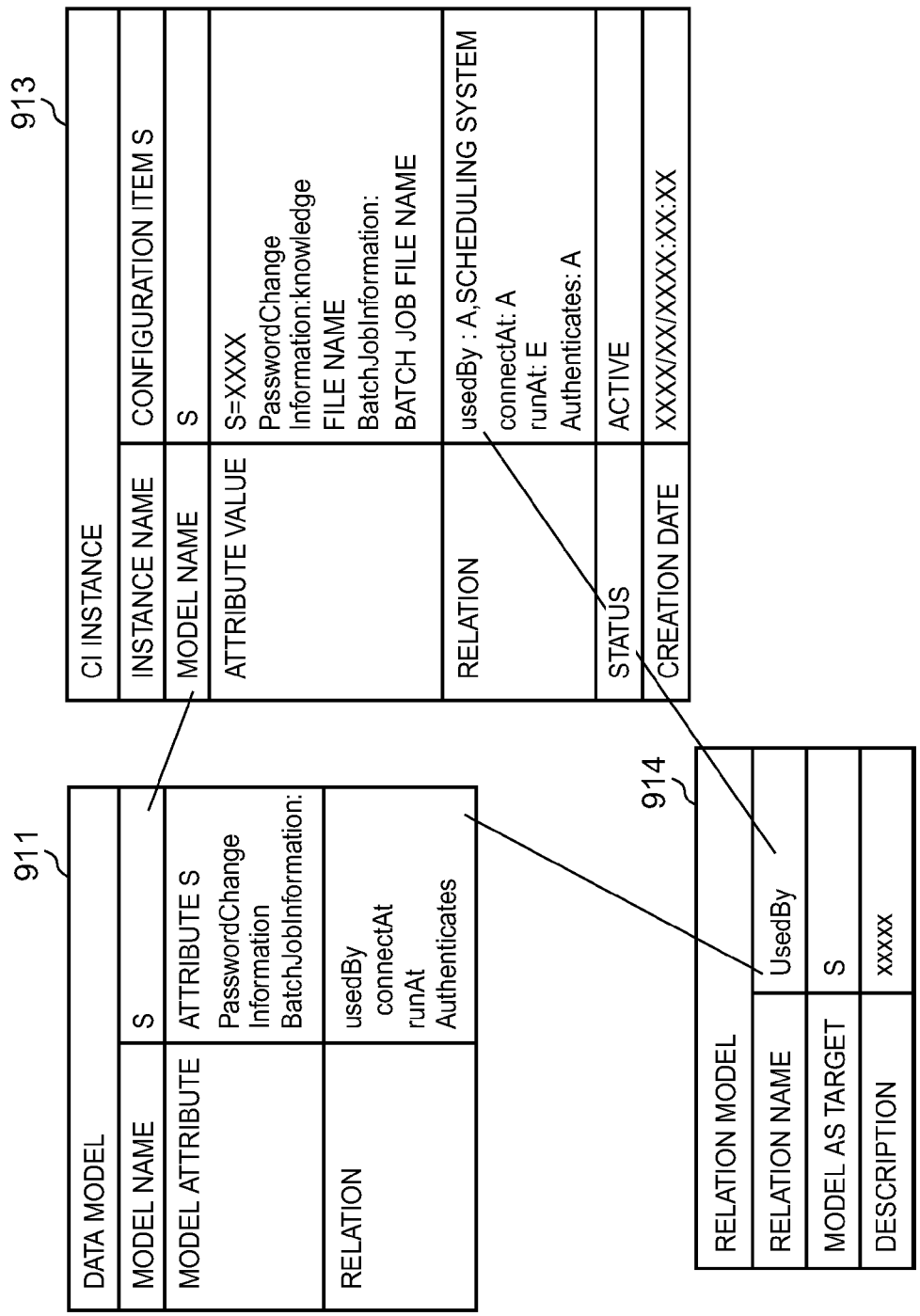
FIG. 9B illustrates a CI instance, a data model and a relation model of the embodiment of the server system S illustrated in FIG. 9A.

FIG. 9B illustrates a CI instance, a data model and a relation model of the server system S in accordance with the embodiment of the invention described above with reference to FIG. 9A.

A data model 911 may roughly correspond to the data model 431 of FIG. 5C, although the data model 911 may further include an attribute "BatchJobInformation" about a batch job. A CI instance 913 may roughly correspond to the CI instance 433 of FIG. 5C, although the CI instance 913 may further include an attribute value "batch job file name" about the attribute "BatchJobInformation."

Figure 9C:
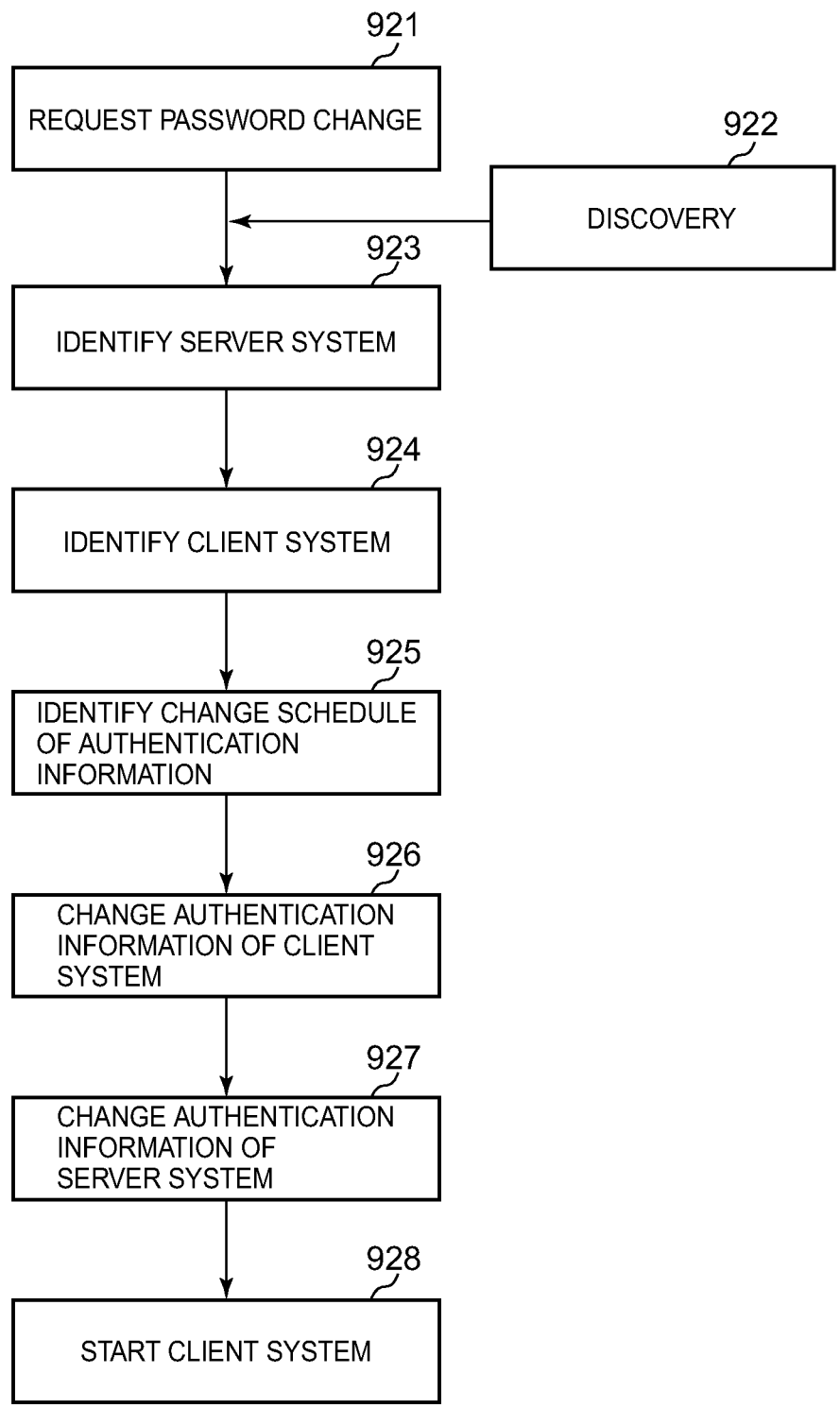
FIG. 9C is a flowchart of an embodiment of a process to change authentication information for the system of FIG. 9A.

FIG. 9C is a flowchart of processing to change authentication information in accordance with the embodiment of the present invention described above with reference to FIG. 9A. At Step 921, an administrator 401 may requests an ID management system 402 to change a password for a server system S 902. At Step 922, in response to the request for password change, a discovery unit 201 may conduct discovery. The discovery may allow an attribute or a relation of configuration items to be updated.

At Step 923, a change synchronization system 403 may identify a CI instance of the server system S 902 among information from the ID management system 402. As a result, the server system S 902 may be identified.

At Step 924, a relation between CI instances of the server system S 902 may be used to identify application software A1 and A2 on a client system. At Step 925, the change synchronization system 403 may identify a schedule to change authentication information. For the purpose of the change, a schedule of jobs recorded in a scheduling system 910 may be used.

At Step 926, a provisioning system 407 may change authentication information of the client system or application software on the client system in accordance with the schedule. At Step 927, the provisioning system 407 may change authentication information of the server system, or application software on the server system, in accordance with the schedule. As with all method steps, note here that Steps 926 and 927 may be conducted in reverse order, at the same time, or in any other order known to those in the art.

At Step 928, the client system, or the application software on the client system, may be started.

The invention claimed is:

1. A system to facilitate changing authentication information for configuration items, the system comprising:
    a first and second configuration item, wherein the first configuration item is a hardware or software component configured to authenticate the second configuration item upon receiving second authentication information from the second configuration item that matches first authentication information associated with the first configuration item, and the second configuration item is a hardware or software component that transmits the second authentication information to the first configuration item in order to establish a connection therewith;
    a plurality of modules implemented in at least one of hardware and a combination of hardware and software, the modules comprising:
        a configuration management database (CMDB) storing records describing the first and second configuration items, the records storing at least one authentication relation between the first configuration item and the second configuration item that describes an authentication relationship between the first and second configuration items, and at least one authentication attribute indicating whether the first authentication information has changed, wherein the at least one authentication attribute and the at least one authentication relation are updated by automated discovery that detects changes to the first and second configuration items, the records further storing at least one attribute pointing to an operation schedule of the first configuration item and the second configuration item, wherein the operation schedule is used to identify a time when the first and second authentication information may be changed;

an identification unit for identifying, in response to a request to change the first authentication information associated with the first configuration item, the second configuration item influenced by the change by examining the at least one authentication relation stored in the CMDB;

the identification unit further configured to identify the operation schedule so that a suitable time for changing the first and second authentication information may be determined; and an instruction unit for initiating a change of the second authentication information associated with the second configuration item.

2. The system of claim 1, wherein the instruction unit further initiates a change of the first authentication information associated with the first configuration item.

3. The system of claim 1, wherein in response to the change of the second authentication information, the instruction unit initiates a change of the first authentication information.

4. The system of claim 1, wherein based on the operation schedule for at least one of the second configuration item and the first configuration item, the identification unit permits a user to determine a time for changing at least one of the first authentication information and the second authentication information.

5. The system of claim 1, wherein, at the determined time, the instruction unit stops operation of the second configuration item and initiates the change of the second authentication information.

6. The system of claim 5, wherein in response to a change of the second authentication information, the instruction unit further initiates a change of the first authentication information.

7. The system of claim 1, wherein, in response to the request to change the first authentication information, the identification unit uses information in the request to identify an attribute or relation associated with the first configuration item in the CMDB.

8. The system of claim 1, wherein the operation schedule comprises a service-providing time of application software and a time needed to start and stop application software.

9. The system of claim 8, wherein the operation schedule further comprises at least one of an authentication method of application software, a change method for changing at least one of the first authentication information and the second authentication information, and time needed to change a password.

10. A method to facilitate changing authentication information for configuration items, the method comprising:

managing configuration of a first and second configuration item, wherein the first configuration item is a hardware or software component configured to authenticate the second configuration item upon receiving second authentication information from the second configuration item that matches first authentication information associated with the first configuration item, and the second configuration item is a hardware or software component that transmits the second authentication information to the first configuration item in order to establish a connection therewith;

storing, by at least one processor in a configuration management database (CMDB), records describing the first and second configuration items, the records storing at least one authentication relation between the first configuration item and the second configuration item that describes an authentication relationship between the first and second configuration items, and at least one authentication attribute indicating whether the first authentication information has changed, wherein the at least one authentication attribute and the at least one authentication relation are updated by automated discovery that detects changes to the first and second configuration items, the records further storing at least one attribute pointing to an operation schedule of the first configuration item and the second configuration item, wherein the operation schedule is used to identify a time when the first and second authentication information may be changed;

identifying, by the at least one processor in response to a request to change the first authentication information, the second configuration item influenced by the change by examining the at least one authentication relation stored in the CMDB;

identifying, by the at least one processor, the operation schedule so that a suitable time for changing the first and second authentication information may be determined; and initiating, by the at least one processor, a change of the second authentication information associated with the second configuration item.

11. A computer program product to facilitate changing authentication information for configuration items, the computer program product comprising a non-transitory computer-readable storage medium having computer-usable program code stored therein, the computer-usable program code comprising:

computer-usable program code configured to manage configuration of a first and second configuration item, wherein the first configuration item is a hardware or software component configured to authenticate the second configuration item upon receiving second authentication information from the second configuration item that matches first authentication information associated with the first configuration item, and the second configuration item is a hardware or software component that transmits the second authentication information to the first configuration item in order to establish a connection therewith;

computer-usable program code configured to store, in a configuration management database (CMDB), records describing the first and second configuration items, the records storing at least one authentication relation between the first configuration item and the second configuration item that describes an authentication relationship between the first and second configuration items, and at least one authentication attribute indicating whether the first authentication information has changed, wherein the at least one authentication attribute and the at least one authentication relation are updated by automated discovery that detects changes to the first and second configuration items, the records further storing at least one attribute pointing to an operation schedule of the first configuration item and the second configuration item, wherein the operation schedule is used to identify a time when the first and second authentication information may be changed;

computer-usable program code configured to identify, in response to a request to change the first authentication information associated with the first configuration item, the second configuration item influenced by the change by examining the at least one authentication relation stored in the CMDB;

computer-usable program code configured to identify the operation schedule so that a suitable time for changing the first and second authentication information may be determined; and computer-usable program code configured to initiate a change of the second authentication information associated with the second configuration item.

* * * * *